(12) United States Patent
Beadles et al.

(10) Patent No.: US 9,302,818 B2
(45) Date of Patent: *Apr. 5, 2016

(54) REUSABLE ENVELOPE

(71) Applicants: Robert Beadles, Lodi, CA (US); Nicole Beadles, Lodi, CA (US)

(72) Inventors: Robert Beadles, Lodi, CA (US); Nicole Beadles, Lodi, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/226,829

(22) Filed: Mar. 27, 2014

(65) Prior Publication Data

US 2014/0284389 A1  Sep. 25, 2014

Related U.S. Application Data

(63) Continuation-in-part of application No. 13/894,896, filed on May 15, 2013, now Pat. No. 8,870,061, which is a continuation-in-part of application No. 13/601,922, filed on Aug. 31, 2012, now abandoned.

(60) Provisional application No. 61/629,741, filed on Nov. 22, 2011, provisional application No. 61/632,100, filed on Jan. 17, 2012.

(51) Int. Cl.
*B65D 27/06* (2006.01)
*G09F 3/02* (2006.01)
(Continued)

(52) U.S. Cl.
CPC ............. *B65D 27/06* (2013.01); *B42D 15/042* (2013.01); *B42D 15/045* (2013.01); *B43L 1/00* (2013.01); *B43L 1/04* (2013.01); *B65D 27/12* (2013.01);
(Continued)

(58) Field of Classification Search
CPC ......... B65D 27/06; G06K 19/025; G09F 3/02
See application file for complete search history.

(56) References Cited

U.S. PATENT DOCUMENTS 4,070,778 A  1/1978  Mahler et al.
4,436,202 A  3/1984  Berkley
(Continued)

FOREIGN PATENT DOCUMENTS

CA   2255185 A1   6/1999
CN   86206833 U   4/1987
(Continued)

OTHER PUBLICATIONS

Robert Dale Beadles, U.S. Appl. No. 13/759,863, filed Feb. 5, 2013.
(Continued)

*Primary Examiner* — Kristy A Haupt
(74) *Attorney, Agent, or Firm* — Franklin & Associates International Inc; Matthew F. Lambrinos

(57) ABSTRACT

The reusable envelope that may include a scannable tag can be scanned by a smartphone to access a data storage location through the internet where customizable video and audio greetings can be provided for viewing by a recipient of the reusable envelope and re-recording when the reusable envelope is to be reused. The reusable envelope has spaces thereon where address and return labels and postage can be removably placed or permanently affixed such as for finite number of shipments using a permanently affixed postage area, for example. The reusable envelope also includes a resealable closure allowing the interior of the envelope to be closed and reopened multiple times for multiple uses (shipments, receiving) or optionally to use a finite number of times by exposing the permanent adhesive to the flat and mating surface depending on user preference.

20 Claims, 24 Drawing Sheets

(51) Int. Cl.
*B43L 1/00* (2006.01)
*B43L 1/04* (2006.01)
*B42D 15/04* (2006.01)
*B65D 27/12* (2006.01)
*H04N 5/76* (2006.01)
*H04N 9/82* (2006.01)
*G09F 3/00* (2006.01)

(52) U.S. Cl.
CPC .............. *G09F 3/02* (2013.01); *G09F 3/0288* (2013.01); *G09F 3/0297* (2013.01); *H04N 5/76* (2013.01); *H04N 9/8211* (2013.01); *B65D 2313/02* (2013.01); *G09F 2003/023* (2013.01); *Y02W 30/807* (2015.05)

(56) References Cited

U.S. PATENT DOCUMENTS

| | | |
|---|---|---|
| 4,439,941 A | 4/1984 | Halperin |
| 4,613,157 A | 9/1986 | Drabish |
| 5,284,365 A | 2/1994 | Stuart |
| 5,513,117 A | 4/1996 | Small |
| 5,626,551 A | 5/1997 | Keams et al. |
| 5,829,790 A | 11/1998 | Phillips |
| 5,892,441 A | 4/1999 | Woolley et al. |
| 5,914,158 A | 6/1999 | McGuinnis |
| D457,555 S | 5/2002 | Stephens-D'Angelo |
| 6,453,300 B2 | 9/2002 | Simpson |
| 7,490,720 B2 | 2/2009 | Cole et al. |
| 7,734,719 B2 | 6/2010 | Friedman et al. |
| 7,751,069 B2 | 7/2010 | Wen et al. |
| 8,162,229 B1 | 4/2012 | Huse et al. |
| 8,584,931 B2 | 11/2013 | Kim |
| 8,870,061 B2 * | 10/2014 | Beadles et al. ............. 235/375 |
| 9,158,770 B1 | 10/2015 | Beadles |
| 2001/0018807 A1 | 9/2001 | Proulx |
| 2004/0134690 A1 | 7/2004 | Norris, Jr. et al. |
| 2006/0282277 A1 | 12/2006 | Ng |
| 2007/0039215 A1 | 2/2007 | Sheridan |
| 2007/0162350 A1 | 7/2007 | Friedman |
| 2009/0001150 A1 * | 1/2009 | Care ........................ 229/301 |
| 2009/0102657 A1 | 4/2009 | Evans et al. |
| 2009/0327885 A1 | 12/2009 | Aoki et al. |
| 2010/0012714 A1 | 1/2010 | Wessner |
| 2011/0025037 A1 | 2/2011 | Wilen |
| 2011/0209365 A1 | 9/2011 | Marsh et al. |
| 2011/0247247 A1 | 10/2011 | Mayer et al. |
| 2011/0258219 A1 | 10/2011 | Ross et al. |
| 2011/0283172 A1 | 11/2011 | Berger et al. |
| 2012/0011751 A1 | 1/2012 | Schimke et al. |
| 2012/0180348 A1 | 7/2012 | Keefe |
| 2012/0181330 A1 | 7/2012 | Kim |
| 2012/0234907 A1 | 9/2012 | Clark et al. |
| 2012/0252405 A1 | 10/2012 | Lortz et al. |
| 2012/0284649 A1 | 11/2012 | Levy |
| 2012/0325902 A1 | 12/2012 | Goyal et al. |
| 2012/0330707 A1 | 12/2012 | Loucks |
| 2013/0008939 A1 | 1/2013 | Griffin |
| 2013/0018726 A1 | 1/2013 | Ionescu et al. |
| 2013/0036635 A1 | 2/2013 | Mayer et al. |
| 2013/0043302 A1 | 2/2013 | Powlen et al. |
| 2013/0126598 A1 | 5/2013 | Beadles |
| 2013/0226995 A1 | 8/2013 | Etheredge et al. |
| 2013/0248606 A1 | 9/2013 | Beadles |
| 2014/0108606 A1 | 4/2014 | Beadles |
| 2014/0117076 A1 | 5/2014 | Eberlein |
| 2014/0181155 A1 | 6/2014 | Homsany |
| 2015/0008256 A1 | 1/2015 | Beadles |

FOREIGN PATENT DOCUMENTS

| | | |
|---|---|---|
| CN | 86200423 U | 5/1987 |
| CN | 201231602 Y | 5/2009 |
| CN | 101707735 A | 5/2010 |
| DE | 3744621 A1 | 4/1988 |
| GB | 2471661 A * | 1/2011 |
| RU | 83027 U1 | 5/2009 |
| WO | WO 99/24250 A1 | 5/1999 |
| WO | WO 2013/078255 A1 | 5/2013 |

OTHER PUBLICATIONS

Robert Dale Beadles, U.S. Appl. No. 13/925,724, filed Jun. 25, 2013.
Robert Dale Beadles, U.S. Appl. No. 14/081,766, filed Nov. 15, 2013.
Robert Dale Beadles, U.S. Appl. No. 14/216,878, filed Mar. 17, 2014.
Robert Dale Beadles, U.S. Appl. No. 14/269,164, filed May 4, 2014.
Robert Dale Beadles, U.S. Appl. No. 14/327,502, filed Jul. 9, 2014.
Robert Dale Beadles, U.S. Appl. No. 14/332,385, filed Jul. 16, 2014.
Robert Dale Beadles, U.S. Appl. No. 29/467,339, filed Sep. 18, 2013.
Robert Dale Beadles, U.S. Appl. No. 29/467,343, filed Sep. 18, 2013.
Robert Dale Beadles, U.S. Appl. No. 61/632,100, filed Jan. 17, 2012.
Robert Dale Beadles, U.S. Appl. No. 61/711,216, filed Oct. 9, 2012.
Robert Dale Beadles, U.S. Appl. No. 61/801,098, filed Mar. 15, 2013.
Robert Dale Beadles, U.S. Appl. No. 62/002,849, filed May 24, 2014.
Robert Dale Beadles, U.S. Appl. No. 61/629,741, filed Nov. 22, 2011.
International Search Report, dated Mar. 6, 2013, in International Patent Application No. PCT/US2012/066155, 4 pages.
Written Opinion of the International Search Authority, dated May 22, 2014, in International Patent Application No. PCT/US2012/066155, 5 pages.
International Preliminary Report on Patentability, dated May 27, 2014, in International Patent Application No. PCT/US2012/066155, 1 page.
Office Action, dated Aug. 1, 2013, in U.S. Appl. No. 13/894,896, 25 pages.
Amendment, dated Sep. 17, 2013, in U.S. Appl. No. 13/894,896, 11 pages.
Applicant-Initiated Interview Summary, dated Sep. 18, 2013, in U.S. Appl. No. 13/894,896, 3 pages.
Office Action, dated Dec. 17, 2013, in U.S. Appl. No. 13/894,896, 35 pages.
Amendment, dated Jan. 30, 2014, in U.S. Appl. No. 13/894,896, 25 pages.
Final Office Action, dated Jun. 13, 2014, in U.S. Appl. No. 13/894,896, 13 pages.
Office Action, dated Sep. 26, 2013, in U.S. Appl. No. 13/601,922, 24 pages.
Office Action, dated Jul. 2, 2014, in U.S. Appl. No. 14/106,656, 27 pages.
International Search Report and Written Opinion mailed Oct. 7, 2015, in PCT/US15/32331, 2 pages.
Robert Dales Beadles, U.S. Appl. No. 29/521,274, filed Mar. 21, 2015.
Office Action mailed Oct. 20, 2014 in U.S. Appl. No. 13/759,863, 9 pages.
Office Action mailed May 28, 2015 in U.S. Appl. No. 13/759,863, 6 pages.
Office Action mailed May 14, 2015 in U.S. Appl. No. 14/081,766, 15 pages.
Office Action Mailed Oct. 28 2015, U.S. Appl. No. 14/332,385, filed Jul. 16, 2014.
Office Action mailed Dec. 5, 2014 in U.S. Appl. No. 14/332,385, 9 pages.
Office Action mailed Jun. 30, 2015 in U.S. Appl. No. 14/332,385, 10 pages.
Robert Beadles, U.S. Appl. No. 14/873,106, filed Oct. 1, 2015.
Chinese Office Action of Jun. 18 2015, issued on Chinese Patent Application 201280067497.8, filed Mar. 6, 2013 in the name of Robert Beadles, (Chinese national phase of International Patent Application No. PCT/US2012/006615, filed Mar. 6, 2013).
Office Action mailed Jan. 20, 2015 issued on U.S. Appl. No. 14/216,878, filed Mar. 17, 2014 to Robert Dale Beadles.
Office Action mailed Mar. 26, 2015 issued on U.S. Appl. No. 14/226,164, filed May 14, 2014 to Robert Dale Beadles.
Office Action mailed Oct. 20, 2015 issued on U.S. Appl. No. 13/925,724, to Robert Beadles.

(56) References Cited

OTHER PUBLICATIONS

International Patent Application PCT/US15/32331, filed May 24, 2015 to Robert Dale Beadles.
U.S. Appl. No. 14/491,850, filed Sep. 19, 2014 to Robert Dale Beadles.
Office Action mailed Apr. 2, 2015 issued on U.S. Appl. No. 14/491,850.
U.S. Appl. No. 14/106,656 filed Dec. 13, 2013 to Robert Beadles.
Office Action mailed Jul. 2, 2014 in U.S. Appl. No. 14/106,656 to Robert Beadles.
Office Action mailed Dec. 4, 2014 in U.S. Appl. No. 14/106,656 to Robert Beadles.
Office Action mailed Mar. 27, 2015 in U.S. Appl. No. 14/106,656 to Robert Beadles.

* cited by examiner

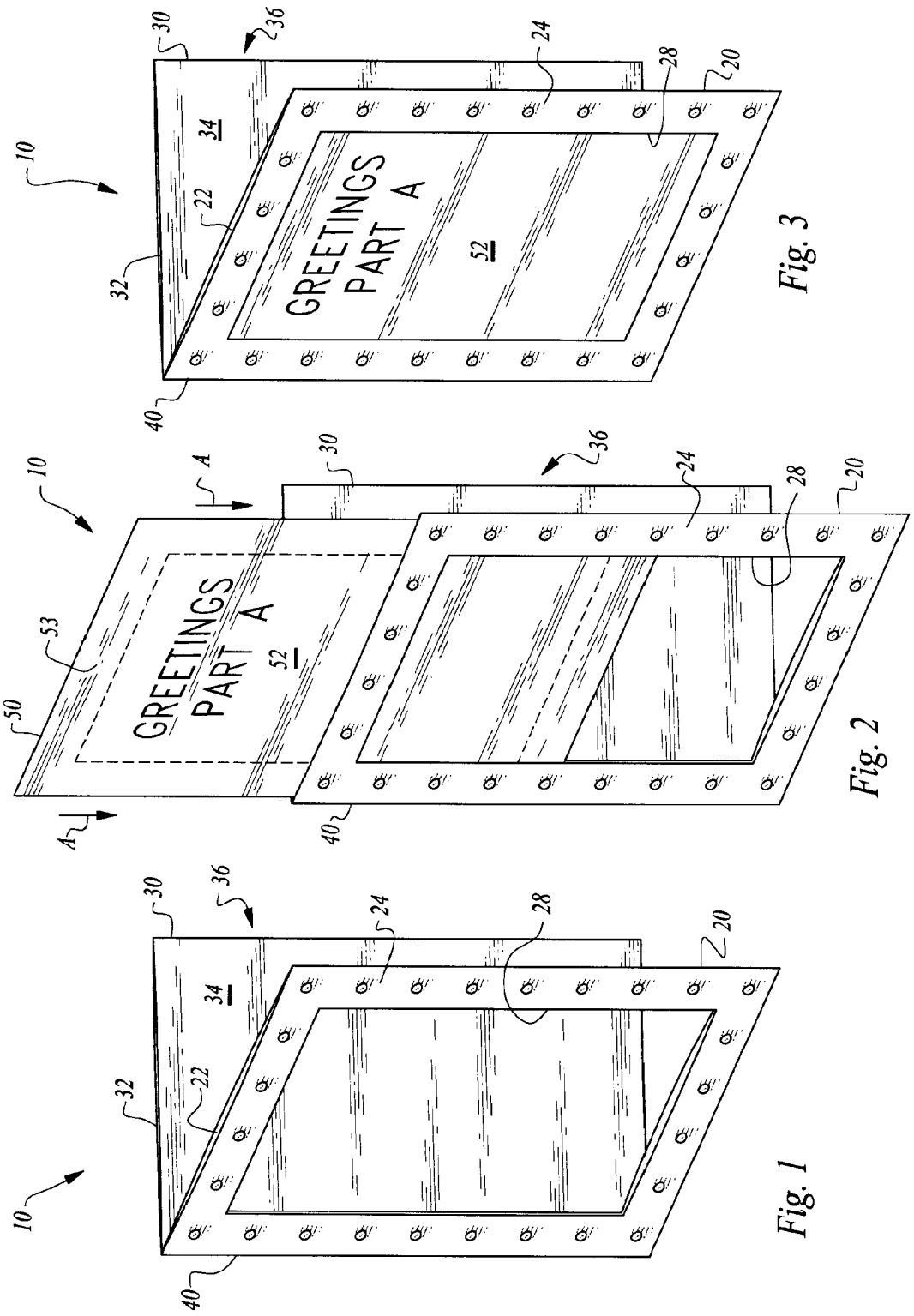

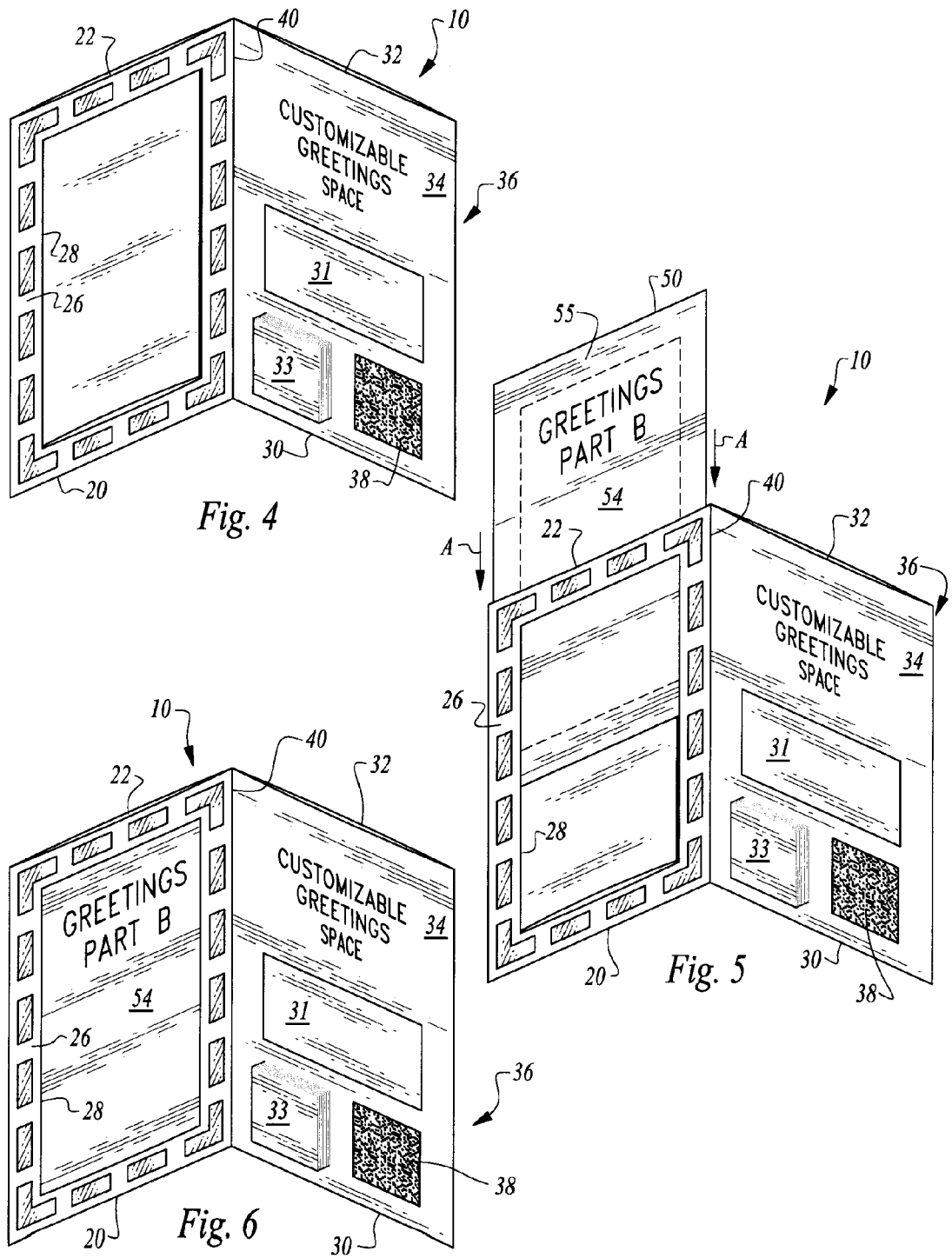

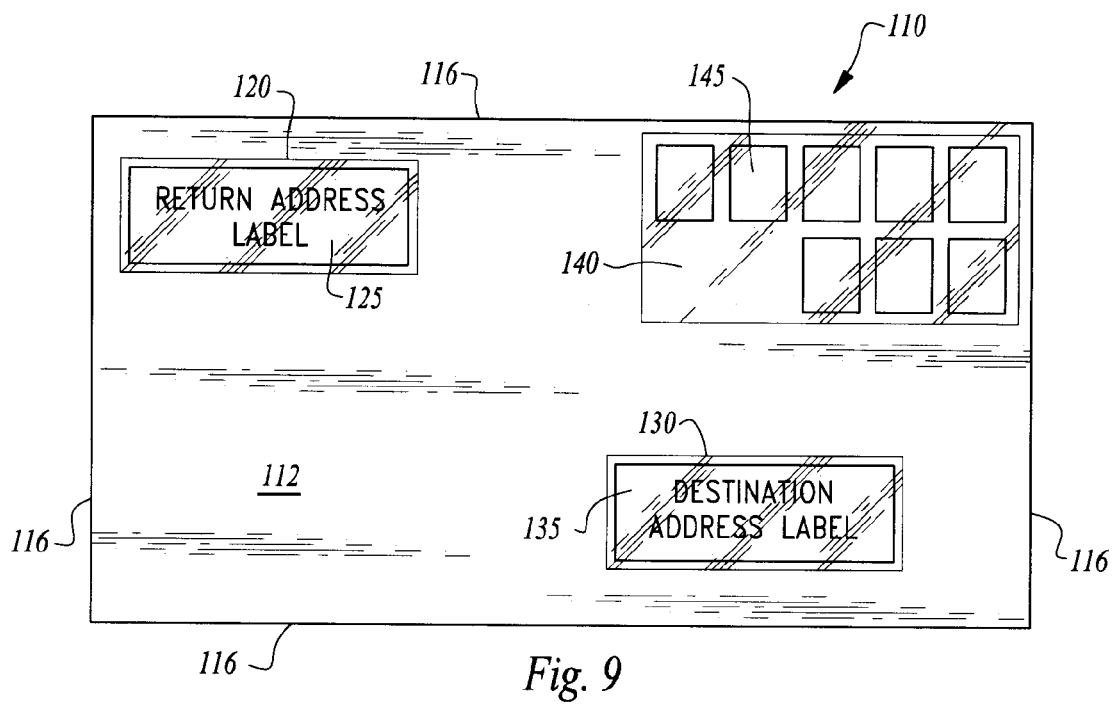
Fig. 9
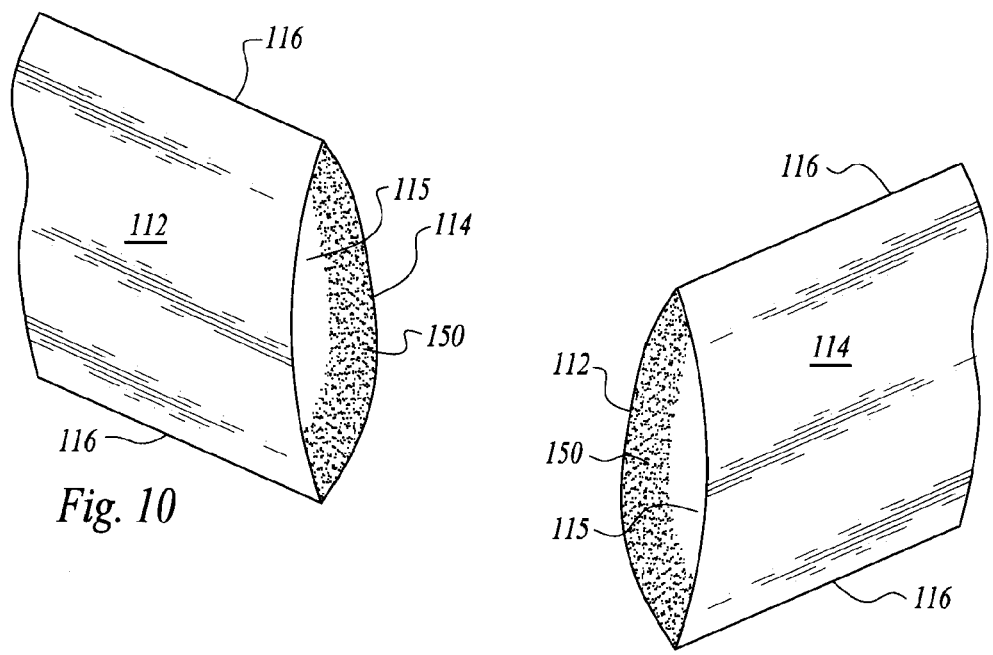
Fig. 10
Fig. 11

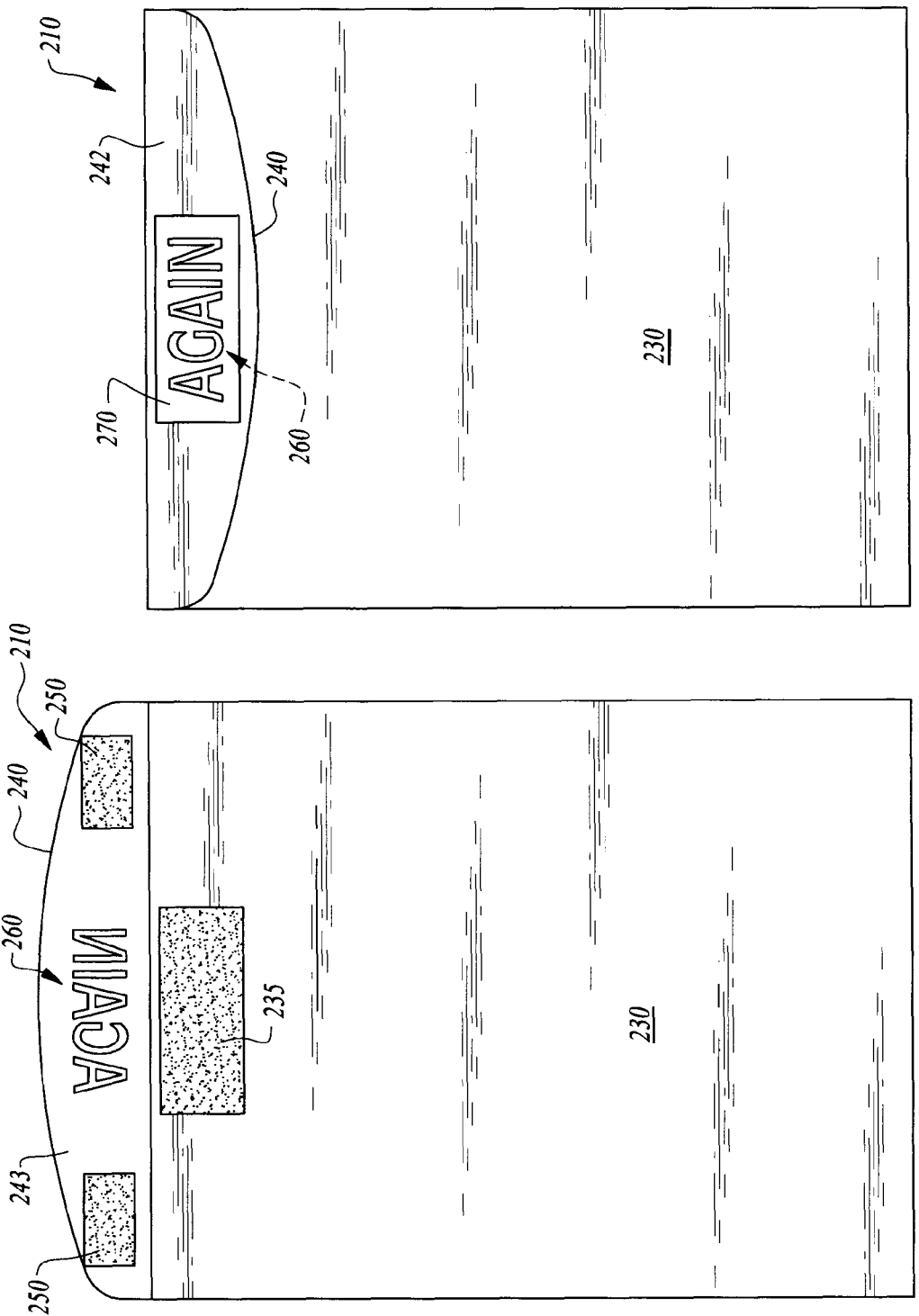

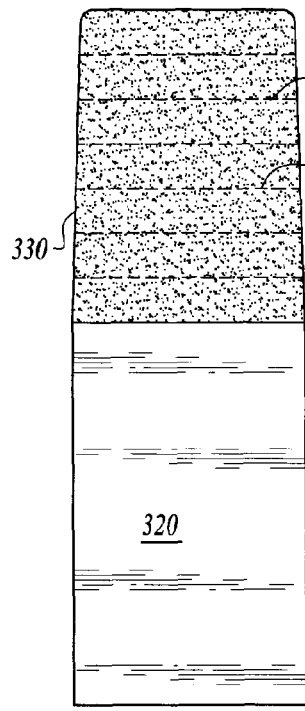 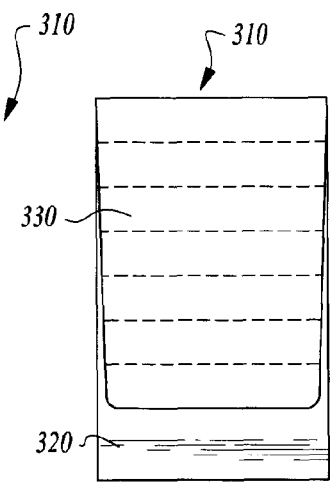 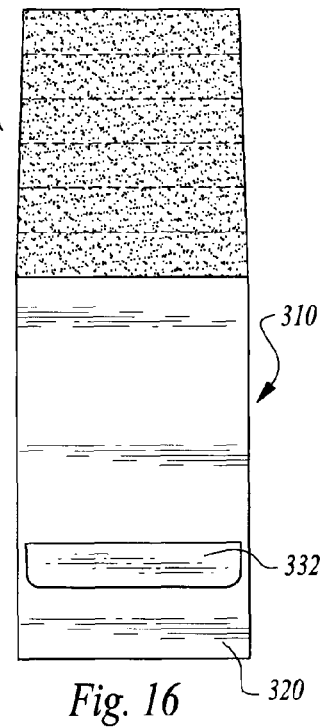
Fig. 14  Fig. 15  Fig. 16
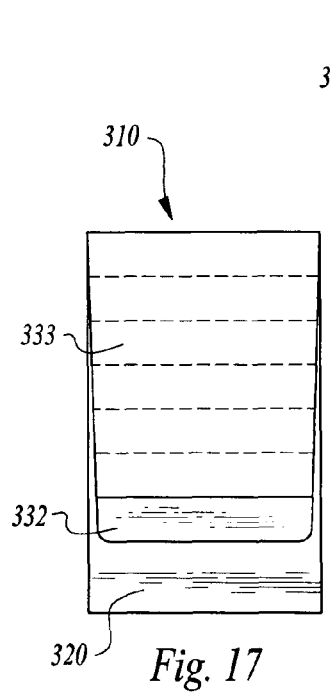 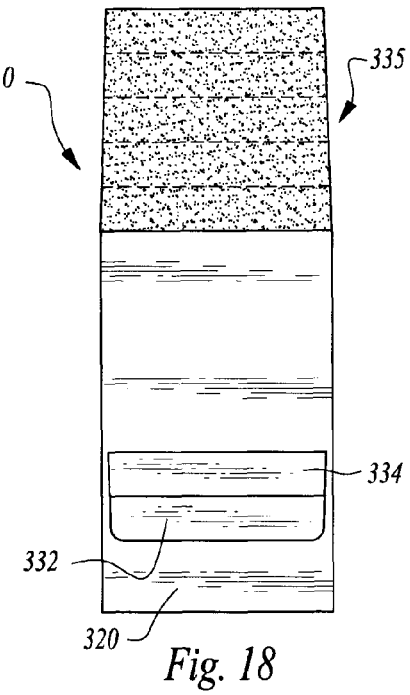 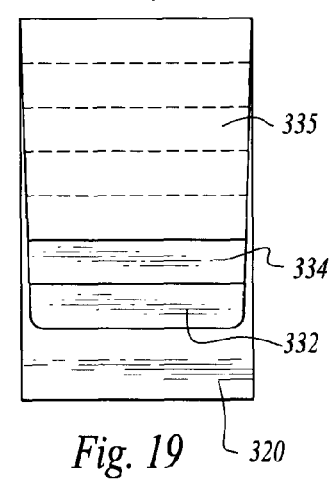
Fig. 17  Fig. 18  Fig. 19

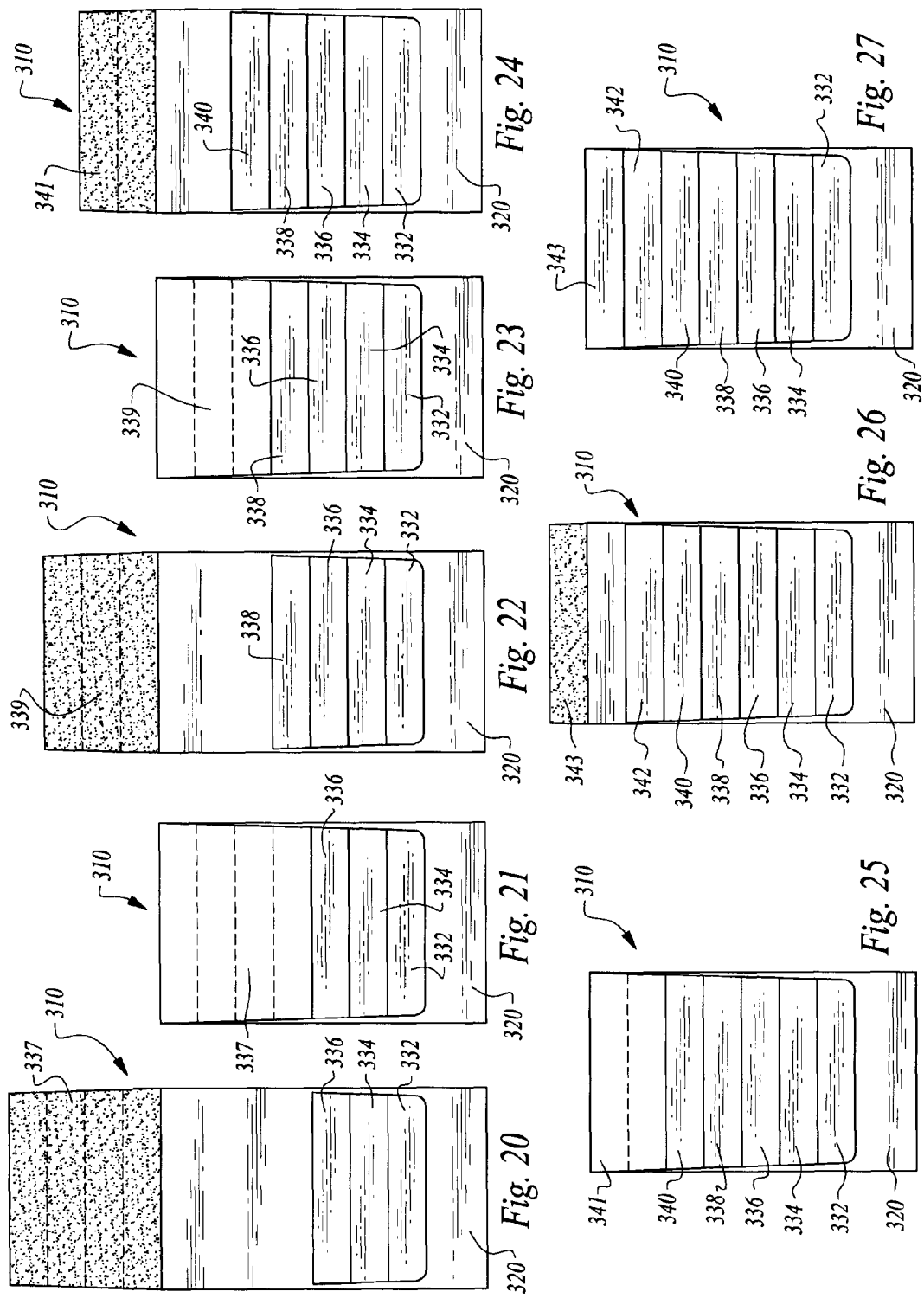

CLEAR, SPECIAL COATING TO ALLOW REUSE OF LABELS AND ENVELOPES

REUSABLE ENVELOPE

CROSS-REFERENCE TO RELATED APPLICATIONS

This application is a continuation-in-part (CIP) of U.S. Non-Provisional patent application Ser. No. 13/894,896 filed on May 15, 2013, pending, which is a continuation in part of U.S. Non-Provisional patent application Ser. No. 13/601,922 filed on Aug. 31, 2012, which claims priority pursuant to 35 U.S.C. §119(e) to U.S. Provisional Application No. 61/629,741 filed on Nov. 22, 2011 and U.S. Provisional Application No. 61/632,100 filed on Jan. 17, 2012, the entire contents of which are hereby incorporated herein by reference as if fully set forth.

FIELD OF THE INVENTION

The following invention relates to postcards, greeting cards, and envelopes for sending messages from a sender to a recipient. More particularly, this invention relates to reusable envelopes which do not require either saving in their original form or discarding, but rather can be reconfigured and reused for sending from a new sender to a new recipient or adapted to be completely reusable or reused a fixed amount of times (at least more than once)

BACKGROUND OF THE INVENTION

Pre-printed greeting cards and postcards are known to be manufactured and sold, typically at retail establishments, to assist individuals in exchanging greetings with others. Such greeting cards typically have a construction primarily of paper or paper-like materials and typically include a message and artwork of some type. Many greeting cards and postcards include plenty of space for customization, such as for allowing a sender to write a personal message in handwriting directly on the greeting card or postcard Greeting cards typically have a theme which correlates with some event which might typically call for the sending of a greeting card. Examples include birthdays, holidays, anniversaries, illnesses, graduations, etc. In addition to the theme associated with the card, cards also can be distinguished in other ways, such as with some cards being humorous and other cards being more sentimental or serious.

Because of the many different types of greetings and the many different particular tastes and styles enjoyed by different individuals, an exceptionally large number of greeting cards must be inventoried at stores if "just the right card" is to be provided for the purchaser. In many instances, multiple aisles of a store are devoted to the display of such cards. Display space within a store is quite valuable to the retailer, such that there is a continuing need to diminish the amount of space required to display a certain number of greeting cards. When the amount of display space available is fixed, it is desirable to have as many greeting card options as possible available within that display space.

Furthermore, one drawback of greeting cards is that they are typically exchanged and enjoyed for a very brief period of time and then typically thrown away. The recipient of the card does not have any opportunity to recoup the value of the card which has been received, but must rather purchase new cards when greetings are to be exchanged back to the sender or to others. Such a disposability cycle for greeting cards is undesirable in that it inefficiently utilizes the natural resources which go into the manufacture of the greeting cards. Furthermore, economically it is less efficient for the users to have such greeting cards used only once and then disposed of. While it would be desirable to reuse a greeting card, such reuse is hampered in that the card has typically already been customized by the sender so that it cannot be reused by the recipient. Furthermore, the recipient may need a greeting card with a different message to accommodate a different special occasion, so that the greeting cards which have been received by the recipient are not suitable for sending out again.

Furthermore, twenty-first century society has gained a significantly heightened awareness of the benefits of reusability and sustainability practices. Such reusability and sustainability practices have found their way into many consumer items. However, greeting cards have not heretofore enjoyed a practical reusable greeting or postcard. Accordingly, this desire to maximize reusability and sustainability is to a great extent frustrated when such individuals are faced with a need to purchase greeting cards.

Envelopes are primarily configured so that they are only used once and disposed of. In at least one instance, an envelope is known which can be inverted and refolded/reconstructed after initial use to be ready for a single further use, such as when in the form of a utility bill envelope which can be converted into an envelope in which a payment can be returned. However, such envelopes are only usable twice and require significant effort to reconfigure the envelope for reuse.

SUMMARY OF THE INVENTION

With this invention, a reusable card, such as a greeting card or postcard is provided, as well as a reusable envelope, so that a greeting card or postcard can be utilized multiple times before its usefulness has been exhausted. While the greeting card could have a variety of different numbers of panels and surfaces associated therewith, a typical embodiment includes at least one panel, preferably two panels, in the form of generally planar substantially rigid paper hinged together. Surfaces of these panels include a front, inside front, inside rear and rear which are provided on a front leaf and a rear leaf that hinge together about a fold therebetween, which generally divides the greeting card into two halves.

A typical embodiment for a reusable postcard in combination with a reusable postcard envelope, includes at least one panel in the form of generally planar substantially rigid paper hinged or folded together to provide a space for an insert such as a postcard or photo to be inserted and contained therewithin. Surfaces of these panels include a front, inside front, inside rear and rear which are provided by a fold therebetween, where a photo, illustration, or traditional postcard may be inserted and at least a portion of said insert may be viewable through a cut-out or a see-through plastic panel. This reusable postcard envelope also has an area with reusable adhesive to hold the photo or traditional postcard therewithin.

The various different attributes of this exemplary greeting card are shown herein in a particular arrangement which is most preferred. However, the various details of this greeting card could be rearranged to different locations in alternative embodiments and alternative embodiments could have a greater or lesser number of surfaces and panels, with or without creases, such as, but not limited to a reusable postcard. Also, while the crease between the two leaves is shown as a vertical crease, this crease could be horizontal or in some other orientation.

In one specific embodiment, a front surface of the front leaf is generally rectangular. A primary feature of this front surface is that a portion of this front surface has been cut away to define a window. Portions of the front surface outside of the window generally have printing thereon which is static in nature. The window is accessible through a slot preferably located at an upper edge of the front leaf, but the slot could be located on a bottom or lateral edge, or the slot could be inboard of the edges.

The reusable greeting card is provided with a multiplicity of inserts which are preferably stored within a storage slot, preferably within an interior of the rear leaf of the greeting card. One of these inserts is selected and subsequently slid into the slot in the front leaf. The insert has a theme and printing thereon which correlates to the theme. The printing typically includes wording and also typically graphics, photographs, etc. positioned on the insert so that when the insert is placed within the slot in the front leaf, this visual information associated with the insert is visible through the window.

In a most preferred embodiment, the insert has printing on both an outer surface and an inner surface. An inside front of the front leaf has an inside window therein similar to the window on the outside front of the front leaf. The printing on the inner surface of the insert shows through the inside window. The printing on both sides of the insert preferably correlate together and associate with a particular theme. Themes could vary as do greeting cards known in the prior art. Examples include inserts specifically provided for Earth Day, Valentine's Day, Mother's Day, Father's Day, Christmas, birthdays, get well soon greetings, graduation, celebrations, other holidays, or other significant life events.

While the windows are shown having a particular shape, size and position, these shapes, sizes and positions could vary for the reusable greeting card. Preferably, each of the inserts would be of a similar shape and would have text and/or other graphic depictions thereon positioned so that they show through whatever window size, shape and position is provided for the front and inside surfaces of the front leaf. While the windows are preferably merely open, they could be filled with a transparent layer which isolates the inside of the window.

The rear leaf preferably is fitted with the storage pocket in which a multiplicity of the various inserts can be simultaneously stored. In addition, the rear panel preferably includes a customizable greetings space where a modifiable message can be provided by the sender. One such customizable greeting space element can be in the form of a stack of sticky notes attached thereto. By having greeting customization limited to a surface of one of these sticky notes, the top note sheet can merely be removed and then a new note sheet is available for the recipient of the greeting card to reuse when sending the card to another recipient. As an alternative (or in addition) to sticky notes, a dry erase surface (or other temporary writing technology, such as pencil or chalk) could be provided which allows for wiping off or erasing one message and writing a new message on such a surface.

A rear side of the rear panel is configured for general instructions and optionally to allow for addressing of the greeting card to the recipient. In this preferred embodiment two dry erase panels are provided, one at an address space for the card and one at a return address space for the card. These spaces correspond with windows in are usable envelope in one embodiment of this invention.

Details of the embodiment(s) of the envelope are described below. By using a dry erase marker, the address and return address can be provided on the card and then the card placed within the reusable envelope with the address and return address showing through these windows. As an alternative, pads of sticky notes could be provided for the address and return address spaces on the rear surface of the rear panel of the greeting card. The reusable greeting card could be utilized with a standard envelope also, if desired.

In one embodiment of the invention, sound can be accommodated with the greeting card. For instance, a song selection wheel can be provided on an edge of the rear panel which is rotatable within a side slot. Rotation of the song wheel allows for selection of different songs which correlate with different special occasions. The sender of the card would rotate the song selection wheel to the desired theme. Then, when the recipient receives the greeting card and opens the greeting card, a switch associated with the greeting card detects when the card has been opened and commences play of the sound file for the greeting card. Such switches, sound storage devices, sound generation speakers, power supplies and other details of this attribute of the reusable greeting card are similar to those known in the prior art for sound generating greeting cards.

In an alternative embodiment, each of the inserts can be fitted with storage media which can store a sound file in the media thereof. A player would read the sound file off of the insert when the insert is placed within the slot in the front panel of the greeting card, with playing of the sound file triggered when the greeting card is opened, or when a button is pushed, or some other trigger actuated.

As another alternative, the inserts could merely have tab on a lower edge thereof which is in a particular position which causes a bottom of the slot to detect the position of the tab and play a corresponding song or other sound file which would then be associated with the proper occasion to which the insert is directed. For instance, an insert associated with Christmas might have a tab at a middle of the lower edge of the insert. When this insert is placed within the slot in the front panel of the greeting card, this middle located tab would engage a sound device at a lower portion of the slot at a middle portion thereof and the sound generating device would be programmed to play a Christmas related song when the tab interacts with the sound playing device at a middle portion of the lower edge of the slot.

As another alternative, a readable element, such as a magnetic strip, could be provided on a lower edge of the insert which would be readable by the sound generating device so that the sound generating device would play music or other sound files which correlate with the information provided upon the readable element of the insert. Other forms of machine readable attributes could be put upon the insert to interact with some form of reader so that a proper sound file is played correlating with the contents of the insert that has been placed within the slot of the front panel.

Another system for associating sound or video with the greeting card includes printing a unique scannable tag on the greeting card, preferably on the rear leaf adjacent the customizable greetings space. A smartphone with a video screen and a camera can scan such a tag and then access a media file storage site over the internet. A file associated with this tag can be created and uploaded by the user of the smartphone. A recipient of the card who later accesses this media storage site will be able to play the sound and/or video file created by the sender. The recipient can also re-record a new media file for use by a new recipient when the greeting card is reconfigured and resent to the new recipient.

The reusable envelope preferably is formed of a flexible plastic, paper material or mixture thereof, and is substantially closed except for along one edge thereof to resist being soiled while passing through the mail or otherwise becoming damaged, such as by coming into contact with water. While this envelope is preferably substantially entirely closed, an openable closure is provided along one edge. The reusable greeting card or other contents can be passed into and removed from an interior open space of the envelope through this openable closure.

One form of openable closure is in the form of a tongue and groove closure such as that provided under the trademark ZIPLOC by S. C. Johnson & Son, Inc. of Racine, Wis. As another alternative, hook and loop type fastening closure systems could be utilized for this openable closure. As a further alternative, snaps could be provided or bendable metal closure elements. Any of a variety of different kind of closures could be utilized including those which utilize adhesive forces, static attraction forces, magnetic forces, mechanical fastening forces or other forces to allow the openable closure to be opened and closed by the user. The closure could be at an edge of the envelope or partially concealed under a flap near an edge of the envelope.

In one embodiment, a pair of windows are provided in one surface of the reusable envelope which align with address spaces and return address spaces on the greeting card. These windows are regions where the material forming the envelope are transparent, with remaining portions of the envelope being opaque. In this way, the address and return address for the envelope can be seen through these windows.

In a second embodiment for the reusable envelope, an outer surface of the material forming the envelope has a surface character which releasably allows adhesive backed materials to readily and securely stick thereto but also be removable without leaving any residue on the envelope. In one form, this material could have a surface akin to the material which is provided on sticker mounting sheets. Often adhesive labels are provided together on a single mounting sheet. The adhesive labels have an adhesive on an undersurface thereof and the labels are mounted upon the mounting sheet. The mounting sheet has a surface finish which can be a form of wax paper, or can be in the form of other known materials to which such an adhesive label can readily and securely stick to, but from which the label can be removed without damage to the label, and which can also have the label reattached and remain securely thereon until again peeled off.

By forming the envelope with an outer surface of such material, various different elements required for proper utilization of the envelope through the mail can be adhesively attached for a first use, and then removed and replaced with other attachments when reused. For instance, a return address label can be placed in an upper left corner of a front face of the envelope and stick securely to this material. When a user grabs a corner of the label and applies a peeling motion to the label, it can be readily peeled off of the envelope. However, the postage, or other labels, will not become inadvertently dislodged. In a similar manner, an address space can be fitted with an address label. The address label can be applied and readily stick to a surface of the envelope, but can also be removed after use leaving no trace on the envelope.

Similarly, postage can be attached to the envelope in the upper right corner. Postage that is formed with the adhesive already in place, without requiring wetting, can be readily attached and removed from the envelope. Illicit reuse of the postage is avoided in that the postage is canceled by the postal service when the envelope passes through the mail. The material on the outer surface of the envelope is preferably of a type which can have a cancel stamp and other ink markings provided on the envelope by the post office adhere thereto initially, but be readily removable, such as by wiping with a tissue, to leave the envelope substantially clean for reuse. In one embodiment, only the regions where postage or labels are to be applied is configured with the material which releasably holds labels or postage, with other parts of the envelope not so configured.

In a non-limiting embodiment, a scannable tag may also be printed in the stamp area, or another area, where at least a portion of said scannable tag may be covered slightly or completely by a label or postage, so that when the receiver receives a card (greeting card or post card), they may subsequently reveal a scannable tag that would have been otherwise hidden, at least to some extent—to attempt or try to maintain at least some privacy, of the media that would be displayed when the scannable tag is read, in particular with the reusable postcard, but may also be used in combination with the greeting card. Alternatively, the scannable tag can be or may be also password protected.

Most preferably, such a reusable envelope has a closure along an edge which has two surfaces which abut each other adjacent this openable edge. These adjacent surfaces can be fitted with hook and loop fastener material to bring the two edges together and allow them to hold each other securely. Alternatively, a flap can be provided to present the surfaces for selective opening and resealing of the envelope.

If desired, some form of seal can be provided over this openable edge, such as a sticker passing over this edge and attaching to front and back sides of the envelope. Such a sticker would be removably attachable as with other stickers due to the coating on the material. However, the seal sticker could be formed sufficiently thin and fragile that the relatively low forces required to peel the sticker from the envelope is sufficient to destroy the seal sticker. In such a way, the potential for tampering with the mail is ameliorated.

Preferably, since an interior of the envelope will contain different contents at different times through repeated reuse, an antimicrobial or antibacterial agent is applied to an interior of the envelope before its initial use, to help in maintaining a sanitary environment within the envelope. Such an antibacterial material could be in the form of a spray of a liquid or gas applied directly into the envelope. As another alternative, a strip of antimicrobial agent bearing material could be inserted into the envelope with printing thereon instructing users to leave that strip within the envelope to continue to provide the antimicrobial benefits.

Most preferably, both a front and rear surface of the envelope have a common surface material so that a return address sticker can similarly be provided on a back side of the envelope. Also, any other stickers such as postage processing barcode stickers can readily be applied to and removed from such a reusable envelope. If desired, a hybrid of the invention of this embodiment and other embodiments could be combined together in various different combinations.

OBJECTS OF THE INVENTION

Accordingly, a primary object of the present invention is to provide a card, such as a greeting card or post card, which can be reused with a new recipient after a first use from a sender to a first recipient.

Another object of the present invention is to provide an envelope which can be repeatedly opened and closed and reconfigured to be sent from a different sender to a different recipient after an initial use, for multiple reuses.

Another object of the present invention is to provide a combination reusable card such as, but not limited to a greeting card or postcard and reusable envelope to allow customizable greetings to be sent multiple times from different senders to different recipients.

Another object of the present invention is to minimize waste associated with discarding of envelopes and greeting cards after initial use.

Another object of the present invention is to provide a greeting card which can be coordinated with a recordable customizable electronic message, such as a video or audio message.

Another object of the present invention is to provide a reusable envelope which securely keeps contents of the envelope closed when intended to be closed, to prevent inadvertent opening, but that can be readily opened and re-closed and reopened multiple times.

Other further objects of the present invention will become apparent from a careful reading of the included drawing figures, the claims and detailed description of the invention.

BRIEF DESCRIPTION OF THE DRAWINGS

FIG. 1 is a perspective view of a front and rear leaf of a reusable greeting card according to a preferred embodiment of this invention, shown before an insert element is placed within a slot in the front leaf thereof.

FIG. 2 is a perspective view of that which is shown in FIG. 1, with an insert element in the process of being placed within a slot in the front leaf thereof.

FIG. 3 is a perspective view of that which is shown in FIG. 1, after the insert has been fully placed within the slot in the front leaf and with portions thereof visible through a window in the front leaf.

FIG. 4 is a perspective view of the reusable greeting card of FIG. 1, shown open to view both the front leaf and the rear leaf and with an insert element not yet in place within a window of the front leaf.

FIG. 5 is a perspective view similar to that of FIG. 4, but with the insert in the process of being inserted into the slot in the front leaf.

FIG. 6 is a perspective view similar to that which is shown in FIG. 4, but after completely placing an insert into the slot in the front leaf.

FIG. 9 is a front elevation view of a reusable envelope according to a preferred embodiment of this invention.

FIG. 10 is a perspective view of that which is shown in FIG. 9 and showing an end thereof in an open configuration for placement of contents, such as the reusable greeting card of FIGS. 1-6, into an interior of the reusable envelope.

FIG. 11 is a perspective view similar to that which is shown in FIG. 10, but from a reverse angle, and showing the opening into the reusable envelope in an open configuration.

FIG. 12 is a rear elevation view of an alternative reusable envelope with a flap and configured for either resealable closure or permanent closure.

FIG. 13 is a rear elevation view similar to that which is shown in FIG. 12, but with the flap shown in a closed orientation.

FIGS. 14-27 are rear elevation views of a second alternative envelope showing a sequence of steps in multiple reuses of the reusable envelope of this second alternative embodiment.

DESCRIPTION OF THE PREFERRED EMBODIMENTS

Figure 7:
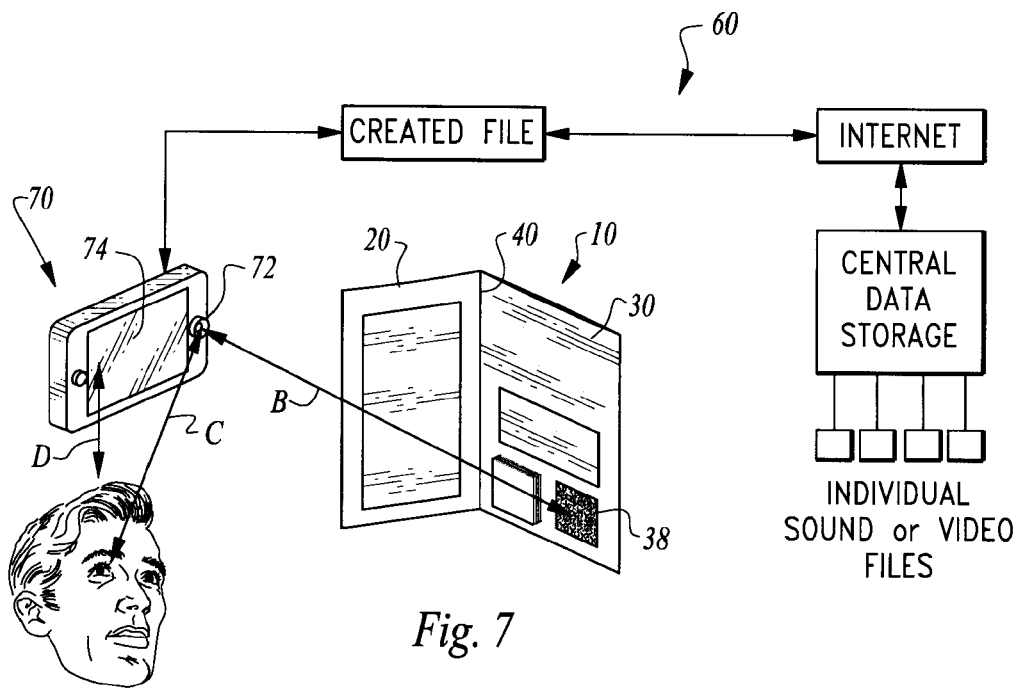
FIG. 7 is a schematic of a storage and usage system of this invention which uses a smartphone and centralized data storage accessible over the internet to allow customizable electronic greetings to be associated with the reusable greeting card.

Referring to the drawings, wherein like reference numerals represent like parts throughout the various drawing figures, reference numeral 10 is directed to a reusable greeting card according to a preferred embodiment of this invention (FIGS. 1-6). The reusable greeting card 10 can both be used multiple times and also can be customized to allow repeated modification by a sender to be appropriate for sending to a variety of unique recipients, such that the greeting card does not need to be discarded, but rather can be reused multiple times. A reusable envelope 110 (FIGS. 9-11) is also associated with this invention. The reusable envelope 110 is preferably sized to receive the reusable greeting card 10 therein and can be utilized multiple times from different senders and recipients. In this way, greetings can be exchanged between senders and recipients with a single greeting card 10 and reusable envelope 110 each used multiple times.

In essence, and with particular reference to FIGS. 1-5, basic details of the reusable greeting card 10 are described, according to this most preferred embodiment. The greeting card 10 includes multiple leaves including a front leaf 20 and a rear leaf 30 which are hinged together about a fold 40. The front leaf 20 is configured to receive an insert 50 therein. A window 28 in the front leaf 20 allows printed material on the insert 50 to be viewed through the window 28, preferably both from a front of the card 10 and when the card 10 is open so that an inside surface of the front leaf 20 is being viewed. The insert 50 can be removed and replaced with other inserts 50 having different greetings or different decorations thereon, such that the basic greeting associated with the greeting card 10 can be selected by the sender to provide a unique greeting to the sender's unique recipient.

Figure 8:
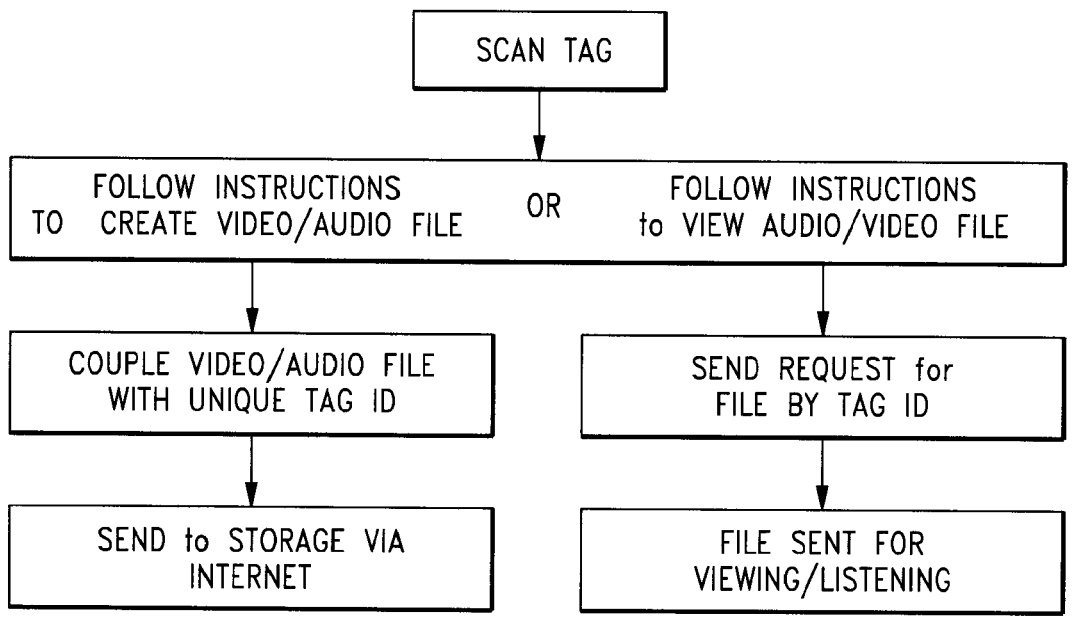
FIG. 8 is a flow chart identifying the steps in creating and using media files associated with the reusable greeting card to provide customizable electronic greetings associated with the reusable greeting card.
Figure 28:
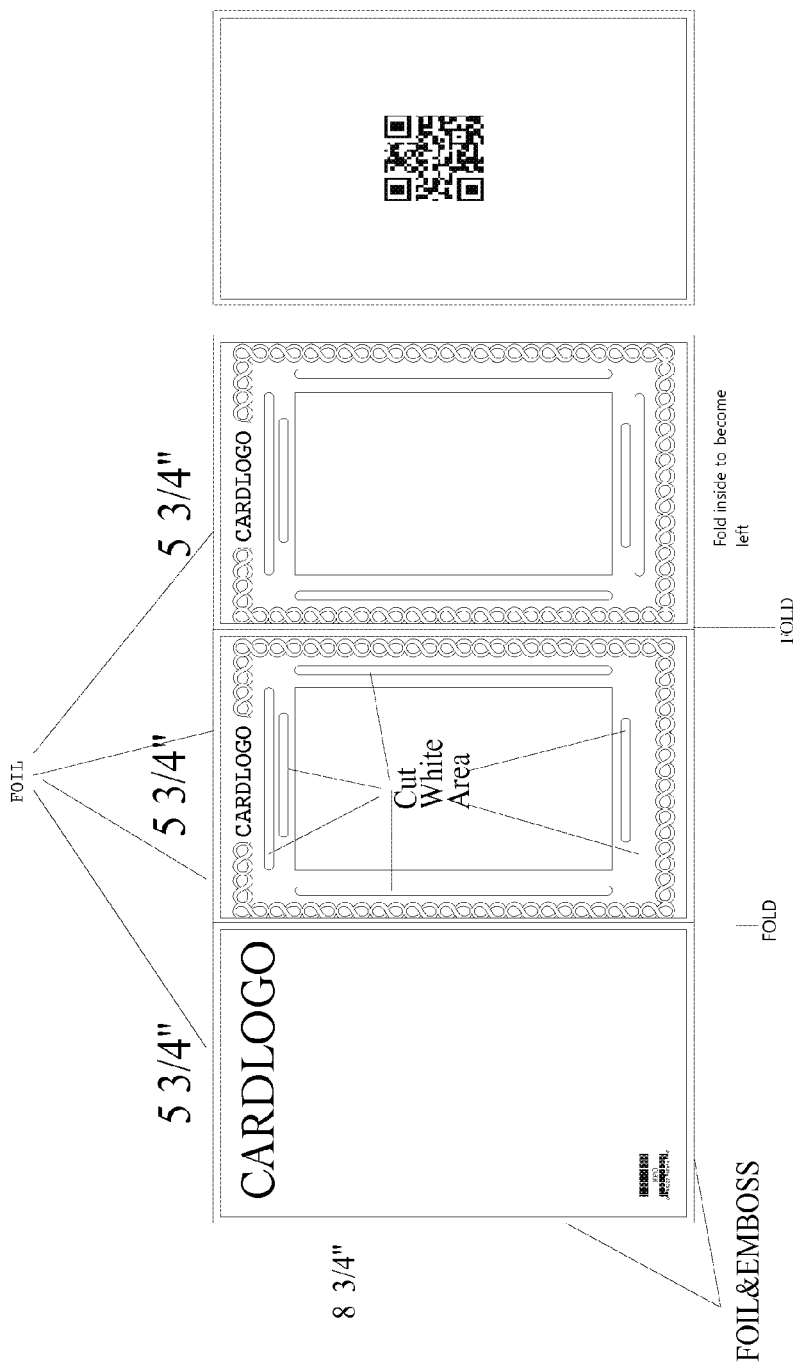
FIGS. 28 and 29 are front and rear elevation views of a specific exemplary embodiment of the greeting card of FIGS. 1-5.
Figure 29:
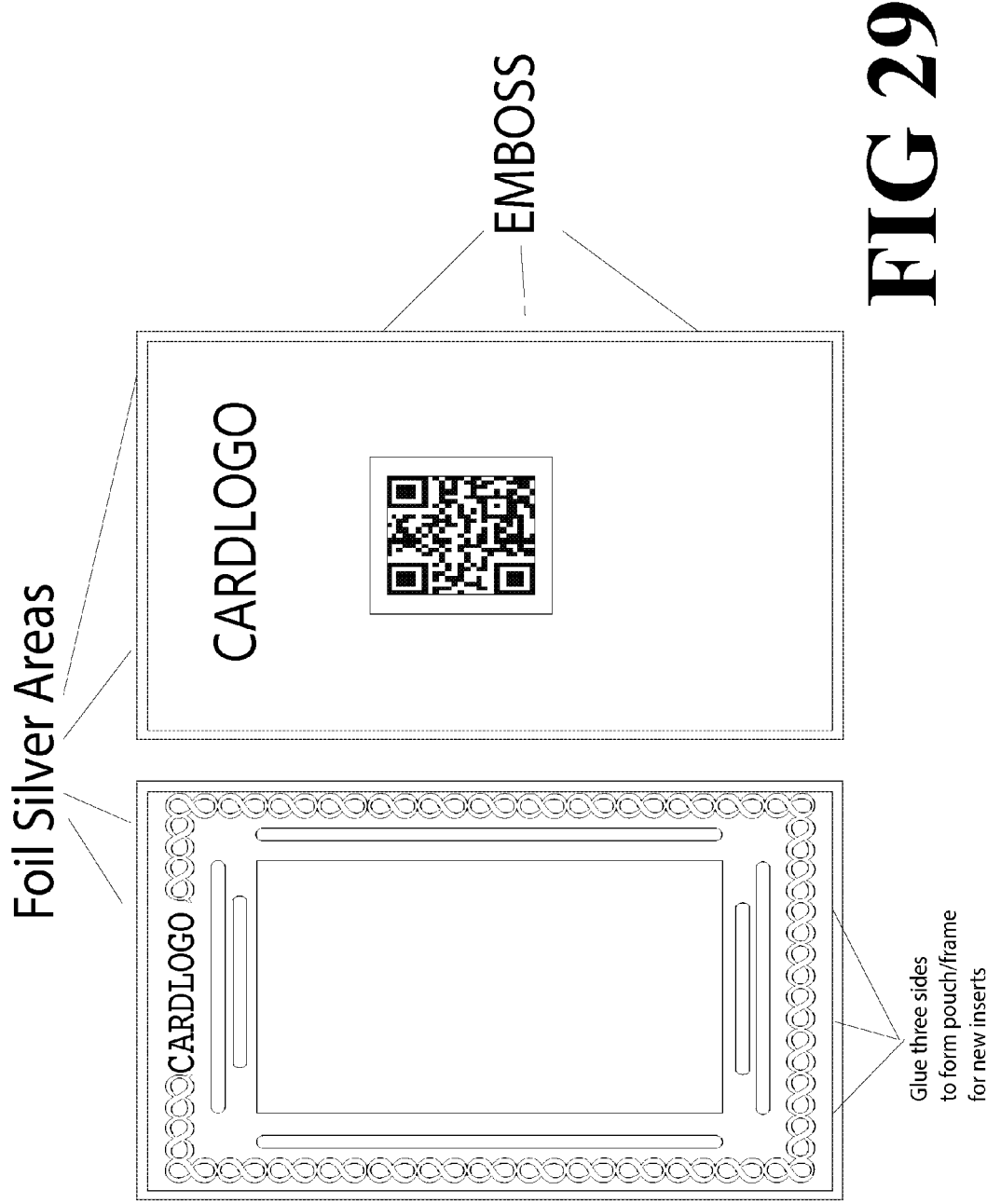
Figure 30:
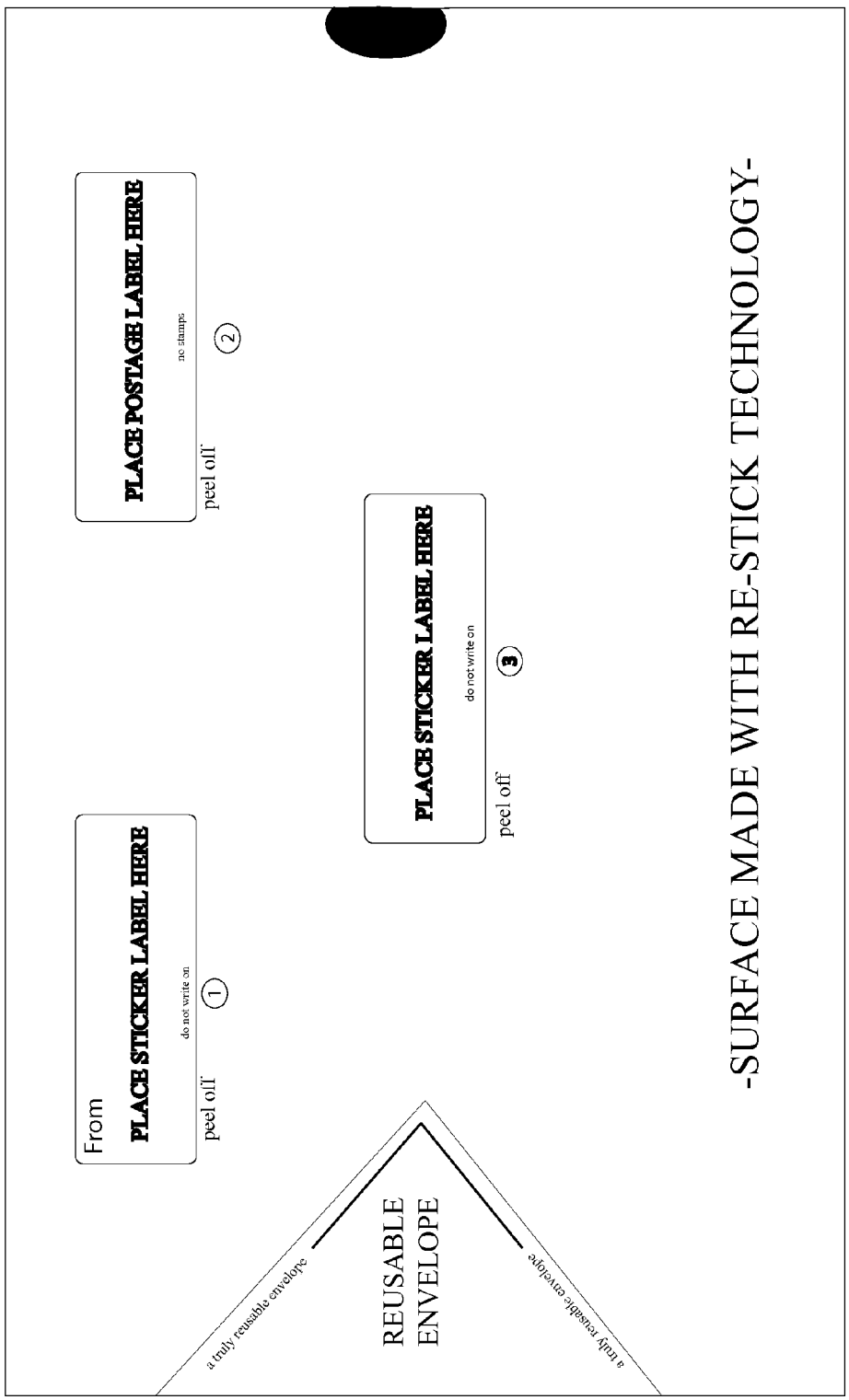
FIGS. 30 and 31 are front and rear elevation views of a specific exemplary embodiment of the reusable envelope of FIGS. 9-11.
Figure 31:
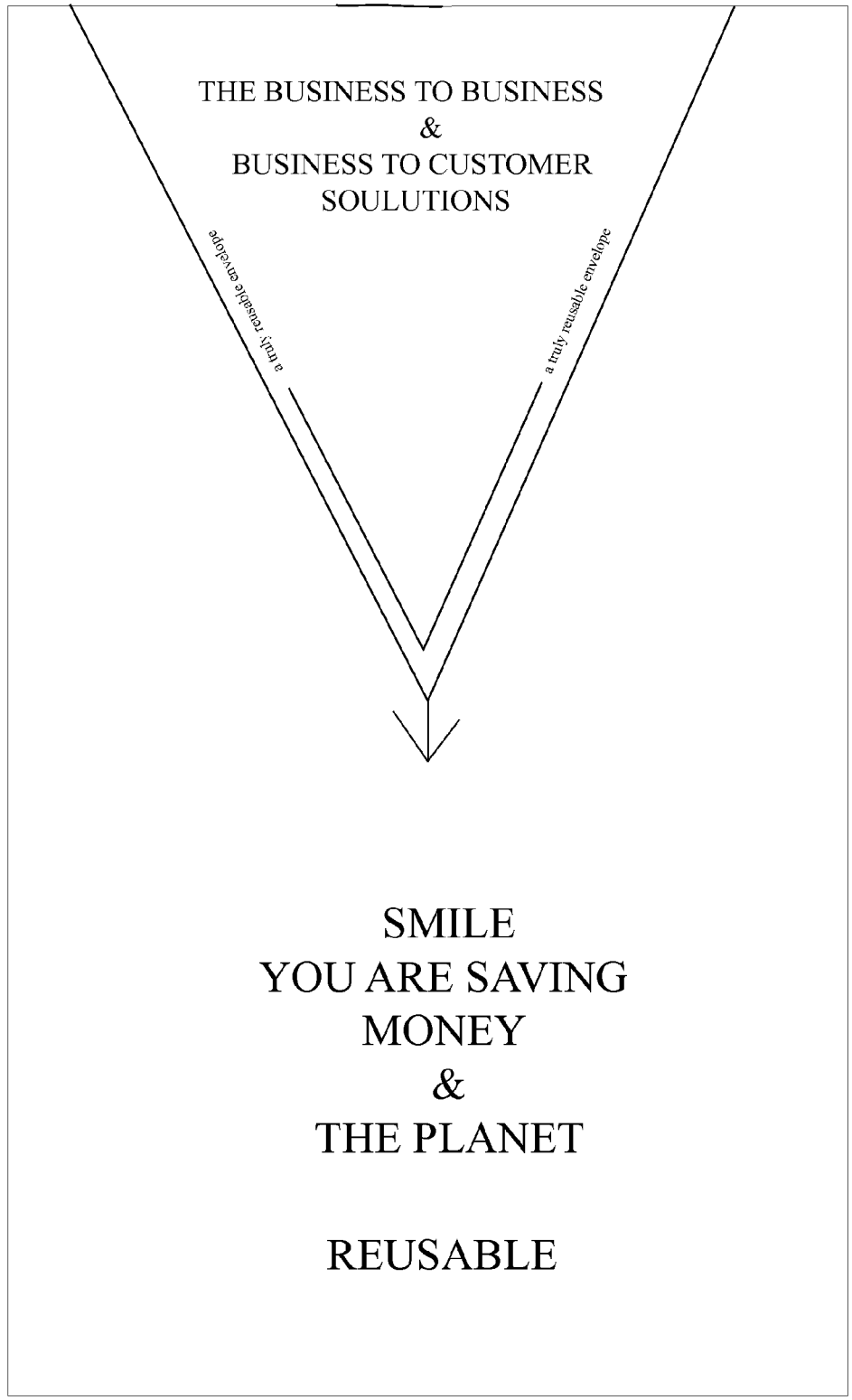
Figure 32:
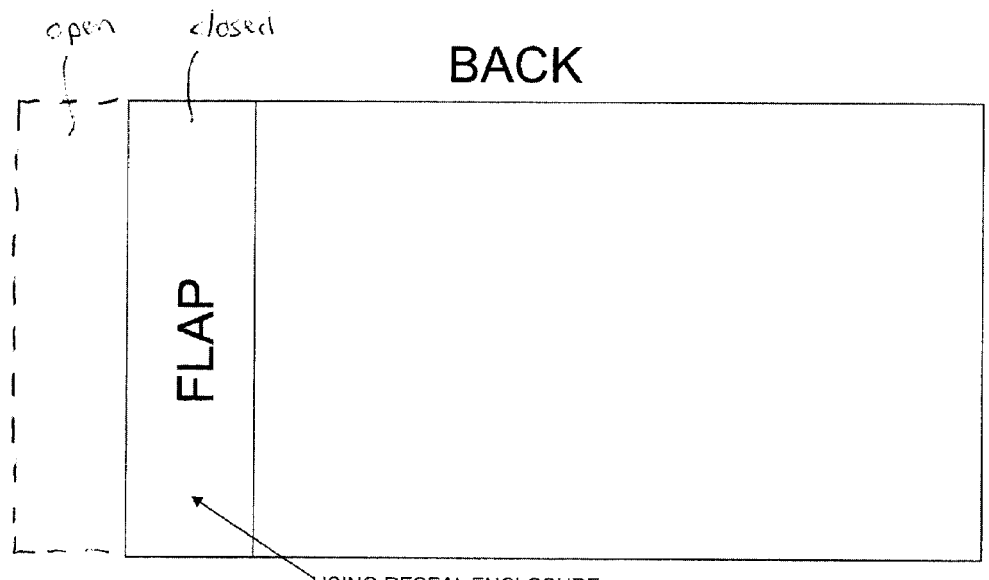
FIGS. 32, 33, and 34 are front and rear elevation views of a further specific exemplary embodiment of the reusable envelope of FIGS. 9-11.
Figure 33:
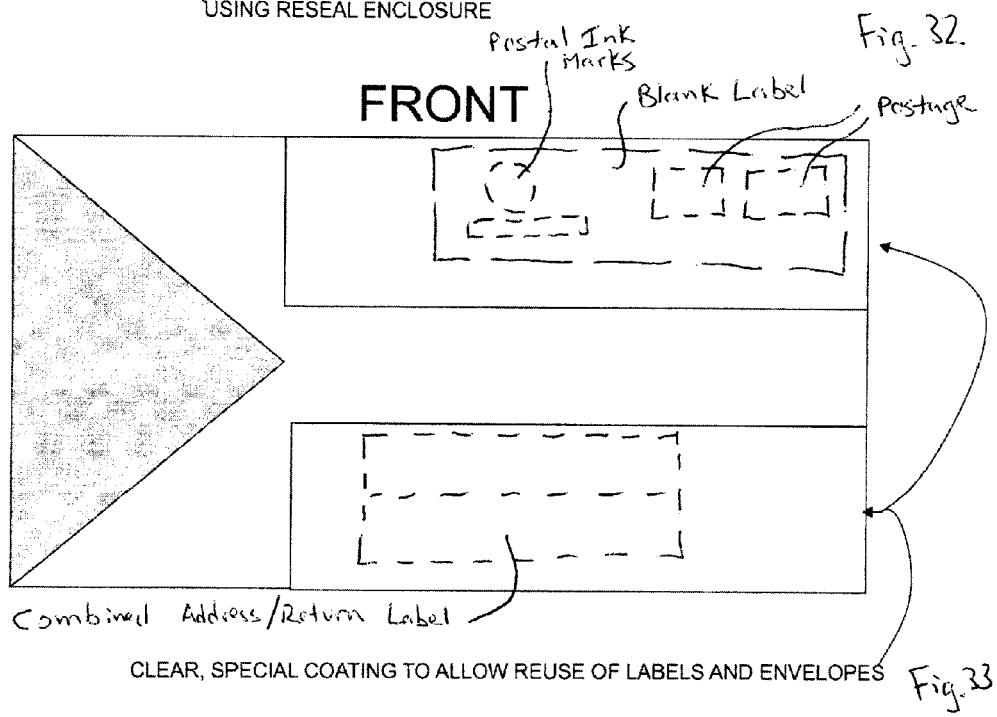
Figure 34:
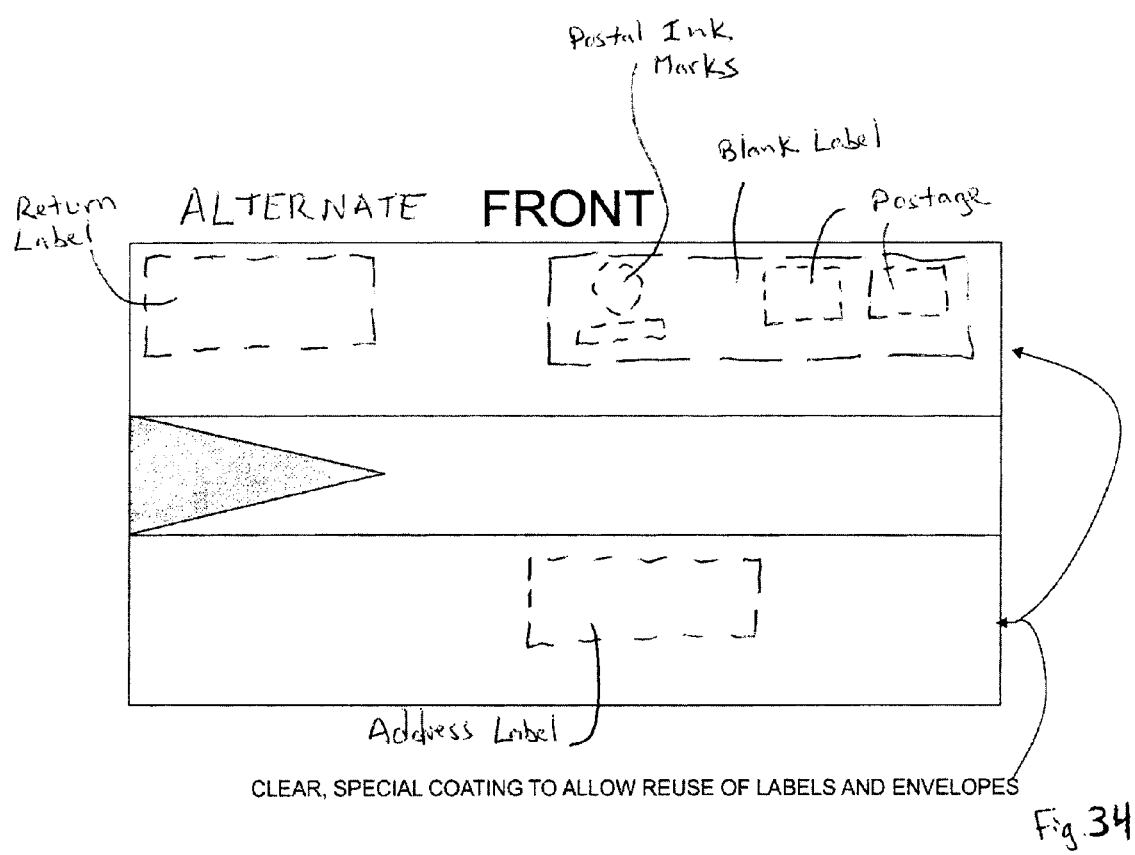

The rear leaf 30 provides a customizable greetings space which can be written upon in an erasable or removable fashion to provide a modifiable message. This customizable greeting space also preferably includes a scannable tag 38 which can be scanned by a smartphone 70 to facilitate the recording and presentation of media such as a video or audio file from the sender to the recipient. Details of this system are shown in FIGS. 7 and 8. The particular media files can be erased and replaced when the greeting card 10 is reused, such that further customizability of the greeting card 10 and overall reusable greeting experience is facilitated.

The reusable envelope 110 includes multiple spaces on a front surface thereof, such as a return space 120, address space 130 and postage space 140. These spaces 120, 130, 140 are each provided with a surface material of a releasable holding character, such as that provided by a unique coating, which readily releases adhesive backed structures such as postage, return labels and address labels 135. Thus, these spaces 120, 130, 140 can have a label 125, 135 or postage 145 placed thereon which will hold securely, but which can later be peeled away when reuse of the envelope 110 is desired. The reusable envelope 110 also has an open edge 115. A resealable closure 150 is associated with the opening at this open edge 115 which can selectively hold the open edge 115 closed or allow the open edge 115 to be opened multiple times, to secure the greeting card 10 or other contents within the open space inside of the reusable envelope 110. Alternative envelopes 210, 310 (FIGS. 12-27) reveal further alternative systems and apparatuses for repeatedly resealing the open edge 115 of the reusable envelope 110 or alternative reusable envelopes 210, 310.

More specifically, and with particular reference to FIGS. 1-6, basic details of the reusable greeting card 10 are described, according to this most preferred embodiment. The reusable greeting card 10 has at least two leaves including a front leaf 20 and a rear leaf 30. The front leaf 20 defines a preferred form of a holder for a first substantially planar sheet and the rear leaf 30 defines a preferred form of a second substantially planar sheet for this invention. Conceivably, further leaves or other planar sheets could also be added. The leaves 20, 30 are hinged together about a fold 40 which attaches the leaves 20, 30 together along an edge thereof and allows the leaves 20, 30 to pivot relative to each other. If more than two leaves 20, 30 are provided, either the same hinge 40 or different hinges at different locations can join such additional leaves to one or more of the leaves 20, 30.

The front leaf 20 is rectangular in this preferred embodiment. The front leaf 20 is formed by two separate planar layers of material with a gap therebetween. This gap is accessible through a slot 22 shown at an upper edge of the front leaf 20 in this embodiment. The slot 22 could be provided on other edges of the front leaf 20 if desired, including either side edge or the bottom edge. The slot 22 is preferably sufficiently large to allow the insert 50 to be slidably placed into and out of the slot 22 for selective access into the gap between the two layers of material forming the front leaf 20.

The front leaf 20 also includes a window 28 formed in at least one of the layers of material on either side of the gap which is accessed through the slot 22. Most preferably, this window 28 extends through both layers of material. The window 28 can merely be an open space or can be closed by a transparent layer, such as transparent film. Portions of the insert 50 can be viewed through the window 28 when the insert 50 is placed through the slot 22 into the gap between the layers of material forming the front leaf 20. Most preferably, the insert 50 has printing on both sides so that the window 28 facilitates viewing of both sides of the insert 50, through either a front side of the front leaf 20 or a rear side of the front leaf 20 within an interior of the card 10.

Most preferably, the window 28 covers a majority of the surface area of the front leaf 20, but less than all of the surface area of the front leaf 20. In this preferred embodiment a border is provided in the form of an outer border 24 on an outside of the front leaf 20 and an inner border 26 on an inner side of the front leaf 20. These borders 24, 26 are preferably similar in size and shape and location so that the window 28 passes through adjacent portions of the two layers of material forming the front leaf 20. The borders 24, 26 help to hold the insert 50 within the gap in the front leaf 20 and act as guides when the insert 50 is being passed through the slot 22 into or out of the front leaf 20. In some alternative embodiments, the front leaf (and optionally also the rear leaf 30) is formed as a clear pouch of plastic or other material so that all or part of the insert 50 can be seen through the clear front leaf 20. A rear leaf 30 insert is fitted into a corresponding rear clear pouch optionally replacing the rear leaf 30, with such clear pouches being hinged together to match the general configuration for the card 10 as described elsewhere herein.

In the embodiment shown, the outer border 24 has a series of holes therein. These holes allow portions of the insert 50 which are hidden by the outer border 24 to be visible through these holes. In the embodiment shown, these holes are circular. In other embodiments, the holes could have other shapes which could be a repeating pattern of similar shapes or unique shapes.

In one embodiment the outer border 24 is formed of a more neutral color than color on portions of the insert 50 which are covered by the outer border 24. The insert 50 has a certain color scheme and the portions of the insert 50 which are covered by the outer border 24 are provided with a complementary color to this color scheme. In this way, portions of the insert shine through the holes in the outer border 24 to provide a color which is complementary with the color scheme of other portions of the insert 50. The inner border 26 (FIG. 4) also has holes therein which can be the same shape or a different shape than the holes in the outer border 24. The inner border 26 has holes therein to provide the same function as the holes in the outer border 24, but which allow portions of an inner portion of the insert 50 to shine therethrough when the insert 50 is placed within the gap in the front leaf 20.

While the outer border 24 and inner border 26 preferably have similar shapes, they could have differing shapes and sizes so that the window 28 has a different shape passing through an outer layer of material forming the front leaf 20 than the form of the window 28 passing through the inner layer of material in the front leaf 20. If desired, multiple windows 28 could be provided in the front leaf 20, such as a pair of windows 28 which are approximately half as wide and of similar height as the window 28. Inserts 50 of correspondingly narrower form could be inserted into such a pair of windows. In a similar way, three or more windows could be provided in the front leaf 20. The window in the front leaf 20 could be offset so that the window that passes through the front layer of the front leaf 20 is offset from the window in the inner layer of the front leaf 20 with separate inserts being viewed through the separate windows rather than a single insert being viewed through both portions of the window simultaneously.

With continuing reference to FIGS. 1-6, details of the rear leaf 30 are described, according to this most preferred embodiment. The rear leaf 30 is preferably also formed from a pair of layers of material with a pocket 32 located between these two layers in the rear leaf 30. This pocket 32 is preferably sized similar to a size of the insert 50. The pocket 32 can store one or more alternative inserts 50. These inserts 50 within the pocket 32 would not be visible, but could be selected by a user when the user is wishing to customize the greeting card 10 for a new recipient.

The pocket 32 can be omitted if desired and the user can purchase or otherwise supply their own insert 50 for reuse of the greeting card 10.

The rear leaf 30 has a front surface 34 generally facing the inner side of the front leaf 20. The rear leaf 30 has a rear surface 36 opposite the front surface 34 which is not shown in FIGS. 1-6. This rear surface 36 can be a location where instructions for use of the reusable greeting card 10 can be provided, and other information about the reusable greeting card 10 can be printed thereon. Alternatively, other customizable elements similar to those provided on the front surface 34 of the rear leaf 30 could also extend onto the rear surface 36. Address spaces could also be on such a rear surface 36, which could be on removable or erasable surfaces and positioned to shine through windows in an envelope, such as at an address space and a return address space.

The rear leaf 30 generally provides a customizable greetings space which defines a portion of the reusable greeting card 10 which can be customized by the sender or particular recipient to provide a modifiable message. Such customizing can include something as simple as a signature of the sender, or can include a personal note in the sender's own handwriting.

If a written message is to be provided, the customizable greeting space accommodates such a written message in a variety of ways. In one methodology, an erasable panel 31 is provided on the customizable greeting space. This erasable panel 31 could be in the form of a dry erase surface with which dry erase markers can be used in a write on and wipe off fashion. The erasable panel 31 could be in the form of a chalkboard-type material which can accommodate writing with chalk thereon which can be subsequently erased away. The erasable panel 31 can be in the form of a surface which readily allows pencil lead to be marked thereon and which can be readily erased with a standard pencil eraser for full erasure of any message. Other erasable writing technology could also be integrated into the erasable panel 31, including either erasable writing technology known in the prior art or hereafter developed.

Another form of customizable greetings space element includes a stack of removable notes 33. Such a stack of separate notes are stacked one upon the other with an adhesive on a rear side of each sheet of notes. The sender would write a customizable note, such as with ink, on a top note. When the reusable greeting card 10 is to be reused, the individual who will reuse the greeting card 10 removes the top sheet from the removable note stack 33, leaving a fresh note at the top of the stack for writing of a new customizable message. A number of sheets in the stack 33 can generally correspond with a number of times that the reusable greeting card 10 is intended to be reused. It is also conceivable that such notes could be replenished from a separate supply should the original inventory of removable notes in the stack 33 be depleted. In one form of the invention, this stack 33 is generally square in form and is similar in shape and construction as many sticky notes such as those provided under the trademark POST-IT by the 3M Company of St. Paul, Minn.

The erasable panel 31 and removable note stack 33 could be supplied alone or in combination on the customizable greeting space, such as on the front surface 34 of the rear leaf 30. The size and position of the erasable panel 31 and removable note stack 33 can also be customized with the orientation shown in FIGS. 4-6 being merely exemplary. In one embodiment, the entire front surface 34 is in the form of an erasable panel 31 utilizing one of the erasable marking technologies identified above. The removable note stack 33 can be attached to some portion of this erasable panel 31, such as by using the adhesive on the back of a lowermost note in the stack 33.

Preferably, the customizable greeting space also includes a scannable tag 38. This scannable tag 38 is some form of tag which can be machine read and correspond with a unique ID number. One form of such tag 38 is known as a "QR code" tag. Preferably, this tag 38 also identifies a URL (Uniform Resource Locator) associated with the world wide web of the internet, or some other generally analogous telecommunications system through which communications between electronic devices can occur. This tag 38 facilitates a further presentation of a customizable greeting from a sender to a recipient. In some embodiments, the tag 38 is printed on the card 10. Alternatively, the tag 38 is provided on a removable sticker. When the card 10 is reused a new sticker can be optionally purchased or otherwise supplied and placed upon or otherwise sent with the card 10.

In particular, and with reference to FIGS. 7 and 8, in one embodiment of the invention the following methodology is implemented. A media storage and usage system 60 is provided which includes a smartphone 70 which includes a camera 72 and a display 74 thereon and which is also capable of accessing the internet. Initially, a user who desires to provide a customizable greeting associated with the card 10, takes the user's smartphone 70 and orients the camera 72 facing the scannable tag 38 (along arrow B of FIG. 7). The smartphone 70 recognizes the tag 38 and accesses a web page on the internet which is associated with a central data storage location. The display 74 of the smartphone 70 provides instructions to the user such as providing a record button and prompting the user to push the record button and then to provide a personal greeting. The user pushes the "record" button and then can provide a recordable data file in the form of text and/or video specifically for the recipient. When the content recording is complete, the user can push the "record" button again or some other form of "end record" button to cause the recording to stop.

The sound and/or video file is recorded and stored at a central data storage location. This data file has a unique ID associated with it which matches the unique ID associated with the tag 38. When a recipient later receives the greeting card 10, the recipient can use the recipient's smartphone 70 to point the camera 72 at the tag 38. The smartphone 70 then accesses the same web site through the prompting of the tag 38 and the unique ID associated with the tag 38 causes the central data storage to call up the data file associated with that unique tag 38. The media file in the form of a video or audio message is then played for the recipient. The recipient can be provided with other options such as to save the greeting permanently, copy the greeting and transfer it for storage on a smartphone 70 or have the greeting emailed to the recipient or to some other designated address selected by the recipient.

When the reusable greeting card 10 is to be reused, the recipient or some other individual who will be reusing the greeting card can again scan the tag 38 with a smartphone 70. When the portal to the central data storage is accessed, rather than selecting for the playing of the message, a separate selection can be made to re-record the message. A new recording of sound and/or audio is then provided within the central data storage which replaces the previous file and is again associated with this tag 38. Then, when the greeting card 10 is resent to a new individual, this new recipient can then be a consumer of the new unique media file in the manner described above.

As another alternative, the card itself can contain a sound file inventory and a sound file player. The sender can select a file that is played when the card 10 is opened. In one form, the sound file is automatically coordinated with the insert 50, such as by putting a magnetic strip on the bottom of each insert 50 and having a reader adjacent the gap in the front leaf 20 to read the strip and cause the sound player to play the appropriate sound associated with the insert 50.

The insert 50 associated with the greeting card 10 preferably is a single rectangular sheet sized to fit within the gap in the front leaf 20 accessed through the slot 22. The insert 50 includes an outer surface 52 opposite an inner surface 54. Preferably, the outer surface 52 includes a first portion of a greeting and the inner surface 54 includes a second portion of a greeting. For instance, if the greeting is in the form of poetry, one-half of the poem might be provided on the outer surface 52 and a second half of the poem might be provided on the inner surface 54. If the greeting is in the form of a joke, or a riddle, a riddle question or first half of the joke can be provided on the outer surface 52 and a riddle answer or second half of the joke can be provided on the inner surface 54. The outer surface 52 and inner surface 54 thus have messages which are correlated together and which come in a two part format.

A border space 53 surrounds the outer surface 52 and a border space 55 surrounds the inner surface 54. These border spaces 53, 55 have coloration and other potential markings which are configured to be visible through the holes in the outer border 24 and inner border 26 in the front leaf 20. The border space 53, 55 keeps the insert 50 securely held within the front leaf 20 and also provides a mechanism by which color coordination of a color scheme provided on the outer surface 52 and inner surface 54 of the insert 50 can be coordinated and more fully integrated into portions of the front leaf 20 to generally provide the appearance that the insert 50 and front leaf 20 are an integrated whole, rather than two disjointed separate parts.

In one embodiment the greeting card 10 is provided with a store of inserts 50 located within the pocket 32. For instance, a dozen separate inserts 50 could be provided within the pocket 32 with different greetings on the different inserts. Some inserts could be in the form of birthday greetings, others could be in the form of holiday greetings, others could be in the form of special event greetings such as graduation greetings, consolation greetings, friendship greetings, and other greetings known in the greetings art or developed in the future. As another alternative, or in addition to this storage of multiple inserts 50 within the pocket 32, store which sells the reusable greeting card 10 can also sell packages of inserts 50 so that users can go to a store (or online store) and purchase new inserts 50 for use with the reusable greeting card 10. If desired, a user can customize the insert 50, such as by writing directly upon the insert 50. When the recipient chooses to reuse the greeting card 10, the insert 50 can be removed and kept by the recipient and then a new insert 50 can be used when the first recipient chooses to resend the greeting card 10 to another recipient.

With particular reference to FIGS. 9-11, particular details of the reusable envelope 110 according to a preferred embodiment of this invention, are described. The reusable envelope 110 preferably has a generally rectangular shape but could have other shapes known in the envelope arts or later developed. The envelope 110 has a basic configuration including a front panel 112 opposite a rear panel 114 which are joined together at a perimeter 116. At least one of the edges of the perimeter 116 is defined as an open edge 115. In the embodiment shown, the right edge of the perimeter 116 of the envelope 110 is the open edge 115, defining an opening into an open space inside the envelope 110.

The reusable envelope 110 includes at least one space thereon which is configured with a coating or outer surface formed of a material which is characterized by being able to releasably hold an adhesive backed structure thereon. In one embodiment the entire front 112 of the envelope 110 is formed of such a material or provided with such a coating or other releasable holding layer. In one embodiment, this layer is merely a wax paper coating. In another embodiment this layer is formed of a similar material to that which has labels or stickers mounted thereon before their use. Such "backing" material is characterized for being able to hold to an adhesive with some force but not so much force that the material is destroyed when the adhesive backed material is removed. This characteristic of the front 112 surface of the envelope 110 allows labels and postage to be removably attached to the envelope 110.

While in one embodiment the entire front 112 is so configured with this releasability layer or characteristic, in the preferred embodiment at least three separate spaces are provided with this characteristic. These spaces include a return space 120 generally in an upper left corner of the front 112, an address space 130 generally in a lower portion of the front 112 generally closer to the right edge than to the left edge, and a postage space 140 generally in an upper right corner of the front 112. These spaces 120, 130, 140 in this embodiment are configured to include the layer or coating which releasably holds adhesive thereon.

A return label 125 can be placed on the return space 120. The return label 125 is typically any standard label which is formed of cellulosic material or other material and has a rear surface with an adhesive thereon. Because of the character of the layer or coating on the return space 120, the return label 125 can be placed on the return space 120 and holds securely thereto. However, the return label 125 can also be readily peeled off of the return space 120 without damage to the return space 120.

Similarly, an address label 135 is provided which can be removably attached in a similar fashion to the address space 130. Also, postage 145 of the type which is preformed with adhesive thereon and ready to stick without wetting, can attach to the postage space 140 and be readily removed for replacement with additional postage. Preferably, the postage space 140 is sufficiently large so that cancelation marks which are used to cancel the postage 145, and also to record receipt of the envelope 110 into the postage system, are printed or applied through a sticker onto the postage space 140. The character of the coating or label forming the postage space 140 is such that any label placed thereon can be peeled away and any printing made directly thereon with ink does not readily hold to the material but can be wiped away such as with a tissue. Because cancelation marks will remain on the postage that has been used, the postage remains canceled and must be discarded (or collected but not useful as postage) and new postage can be placed on or onto the envelope 110.

In some alternative embodiments, a large releasable blank label is provided at the postage space 140, large enough for both the postage and any postal service markings applied as part of the mail processing system. Then this label can be removed along with the canceled postage and other markings and a new blank label applied for envelope 110 reuse.

If desired, the address label 135 can be moved to the return space 120 when the reusable envelope 110 is to be reused by the recipient for sending to a new recipient. If the recipient intends to reuse the reusable envelope 110 to send back to the original sender, the return address label 125 can be moved to the address space 130. In such a fashion, even the address label 135 and return label 125 can conceivably be reused. In one embodiment of the invention, a rear 114 of the envelope 110 (or at least a space thereon) can also be configured with the same coating or layer having the releasable characteristic described above.

The open edge 115 of the reusable envelope 110 preferably includes a resealable closure 150 associated therewith. In this way, the open edge 115 can be opened for placement of contents into the reusable envelope 110, such as the reusable greeting card 10. This resealable closure 150 can then be transitioned to a closed configuration to seal the reusable envelope 110 closed and to keep contents safely therein. In one embodiment this resealable closure 150 is fitted with complemental hook and loop fastener technology such as that provided under the trademark VELCRO provided by Velcro Industries B.V. of Curacao, Netherlands. As another alternative, one side of the open edge 115 can be provided with the same releasable holding material provided on the return space 120, address space 130 and postage space 140, with an opposite facing portion of the open edge 115 formed with a releasable adhesive similar to that provided on a rear surface of labels and postage. In such an embodiment the same resealable closure mechanism to provide a closure holding force, is provided at the open edge 115 as is provided at the return space 120, address space 130 and postage space 140.

With particular reference to FIGS. 12 and 13, details of an alternative envelope 210 are described. This alternative envelope 210 can have a front panel and rear panel similar to that of the reusable envelope 110 (FIGS. 9-11). Uniquely, this alternative envelope 210 includes a rear 230 with a flap 240 extending therefrom adjacent an opening into an interior of the envelope 210. The flap 240 has a front 242 opposite a rear 243. Openings 260 pass through this flap 240. In one embodiment these openings 260 form a letters or a word, such as the word "AGAIN" or a trademark or other graphic. In some embodiments, the openings 260 form some other pattern, block or box, or other area for a semi-hidden scannable tag that may be partially or completely hidden. The rear 230 includes a release agent panel 235 similar to the return space 120, address space 130 or postage space 140 of the envelope 110 (FIGS. 9-11).

An adhesive panel 270 is placed on the front 242 of the flap 240 over the openings 260. Thus, portions of the adhesive panel 270 extend through the openings 260 and come into contact with the release agent panel 235. In this way, the flap 240 can be selectively closed and opened, which may also serve to cover at least a portion of a scannable tag contained therewithin.

As an alternative, or in addition, permanent adhesive 250 can be provided in panels, such as on lateral ends of the flap 240. If a user desires to have a higher degree of security in closing the envelope 110, but at the expense of reusability, the permanent adhesive 250 can be utilized, such as be wetting a wettable adhesive, or by removing a cover off of a permanent adhesive, so that the permanent adhesive 250 can securely close the flap 240 against the rear 230 in a permanent fashion. The envelope 210 would then be opened in a destructive fashion, such as by tearing open when such a permanent adhesive 250 has been used.

With particular reference to FIGS. 14-27, details of a second alternative envelope 310 are described. The second alternative envelope 310 has a front panel and rear panel similar to the envelope 110 (FIGS. 9-11). Uniquely, the second alternative envelope 310 has a rear 320 with a flap 330 extending therefrom. This flap 330 has a series of separate stubs joined together by perforations 331 or other zones of weakness with lesser strength than adjacent material. Each stub is preferably a similarly sized structure. The flap 330 has a long form with multiple stubs oriented parallel to each other. Each stub has a permanent adhesive thereon. A user would initially encounter the envelope 310 as viewed in FIG. 14. Contents would be provided into an interior of the envelope 310. A use then wets or otherwise activates a stub 332 at a distal end of the flap 330 and folds the flap 330 closed (FIG. 15). When the envelope 310 is to be opened, the perforation adjacent the stub 332 is torn and the flap 330 pivoted open (FIG. 16). The stub 332 remains adhered to the rear 320 of the envelope 310, but other portions of the flap 330 pivot open (FIG. 16).

When the envelope 310 is to be reused, the second stub 334 is wetted or otherwise activated, and the shortened flap 333 is closed onto the rear 320 of the envelope 310. When the envelope 310 is to be again opened, the flap 330 is torn at a second perforation leaving the second stub 334 on the rear 320 of the envelope 310, and the second shortened flap 335 is allowed to pivot open to provide access into an interior of the envelope 310.

In FIG. 19 the envelope 310 has been again closed by wetting or otherwise activating of the third stub 336 and closing it against the rear 320 (FIG. 19). To open the envelope 310, a perforation adjacent this third stub 336 is torn, leaving the three stubs 332, 334, 336 remaining on the rear 320 and the remaining shortened flap 337 pivoted open. Further usage involves closing of the flap 337, after activation of the fourth stub 338. When the envelope 310 is to be again opened, the fourth stub 338 is torn from the flap 337 to leave a shorter flap 339 which can be pivoted open (FIG. 22). Another closure of the shortened flap 339 can occur (FIG. 23) and with wetting or other activation of a fifth panel 340 allowing secure closure.

When the envelope 310 is to be again opened, the stub 340 is allowed to remain on the rear 320, with tearing above the stub 340 to allow only the shortened flap 341 to pivot open. As depicted in FIG. 25, this shortened flap 341 can again be sealed closed, such as by wetting or other activation of a sixth stub 342 (FIG. 26). When reopening is desired, the remaining flap 343 can be pivoted open, leaving the sixth stub 342 adhered to the rear 320 of the envelope 310. Finally, the remaining flap 343 can be closed against the rear 320 for a final usage of the envelope 310, such as by wetting or other activation of an adhesive on this final flap 343. In this embodiment, such an envelope 310 can be utilized seven times with secure sealing each time. With a greater number of stubs still more re-usages could be facilitated.

Figure 35:
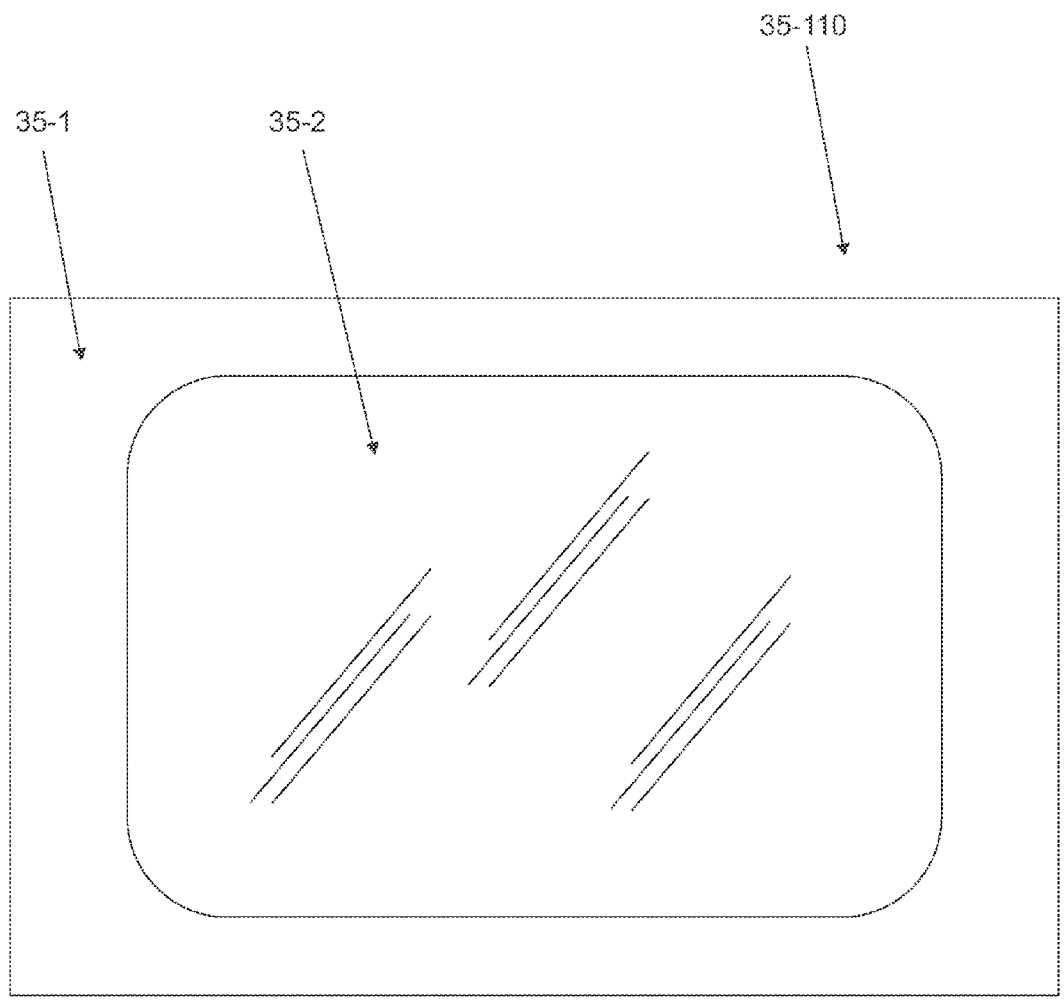
FIGS. 35 and 36 are front and rear elevation views of a further specific exemplary embodiment of the reusable envelope for the postcard.
Figure 36:
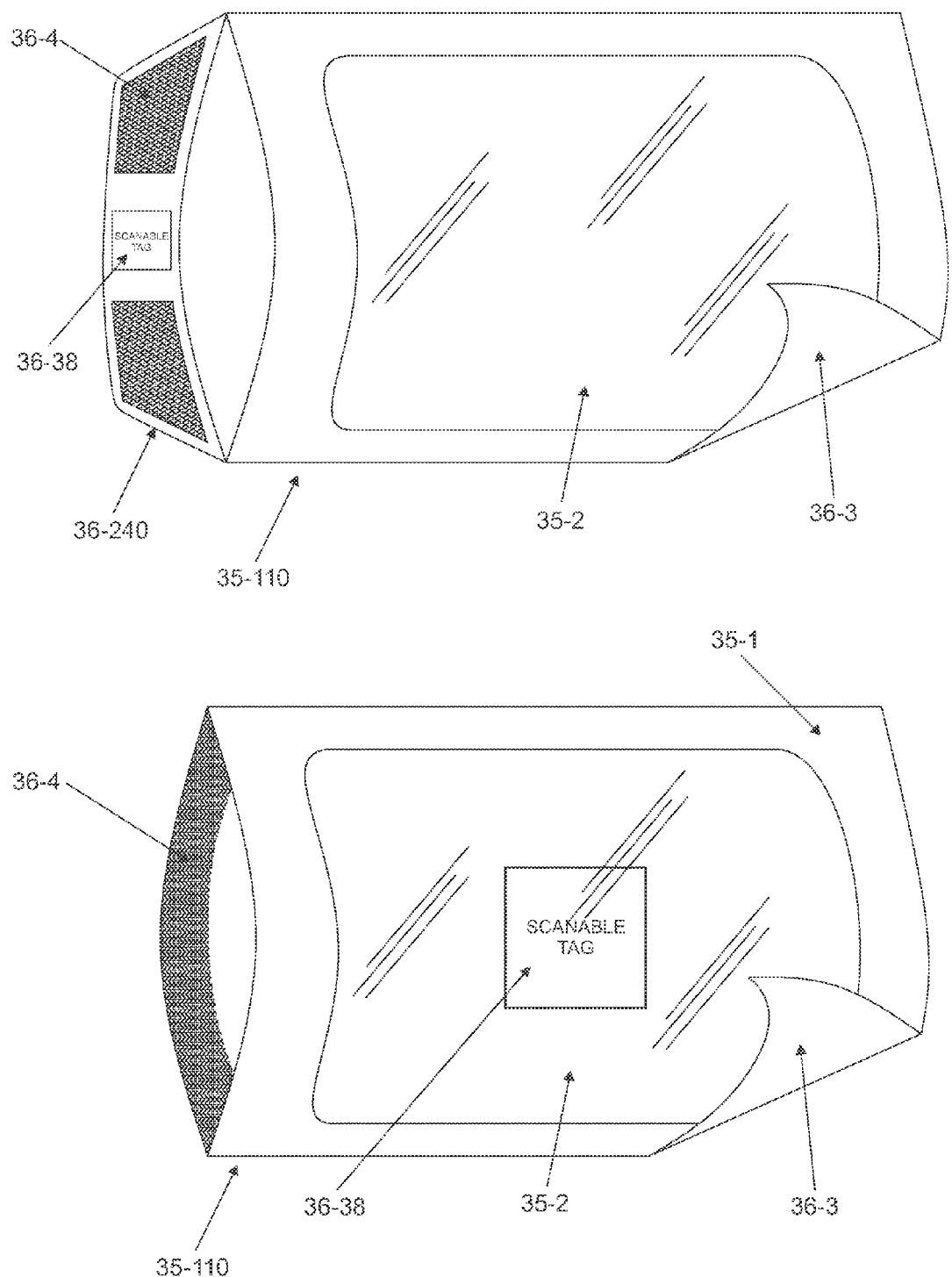

In FIGS. 35 and 36, a reusable envelope 35-110 for the card (the postcard or other insert) according to some embodiments is shown. In these front views, the first planar panel 35-1 is shown with a cut out or see-through area 35-2 that allows for at least a portion of an insert to be viewed. In FIG. 36, a scannable tag 36-38 is shown through the cut-out/see-through area 35-2 or on the envelope closure 36-240, both as non-limiting embodiments. The back panel of the reusable envelope 35-110 is shown as 35-3, with a portion reusable adhesive shown 36-4. Note: both the front and rear panel may be coated with reusable adhesive in corresponding areas.

Figure 37:
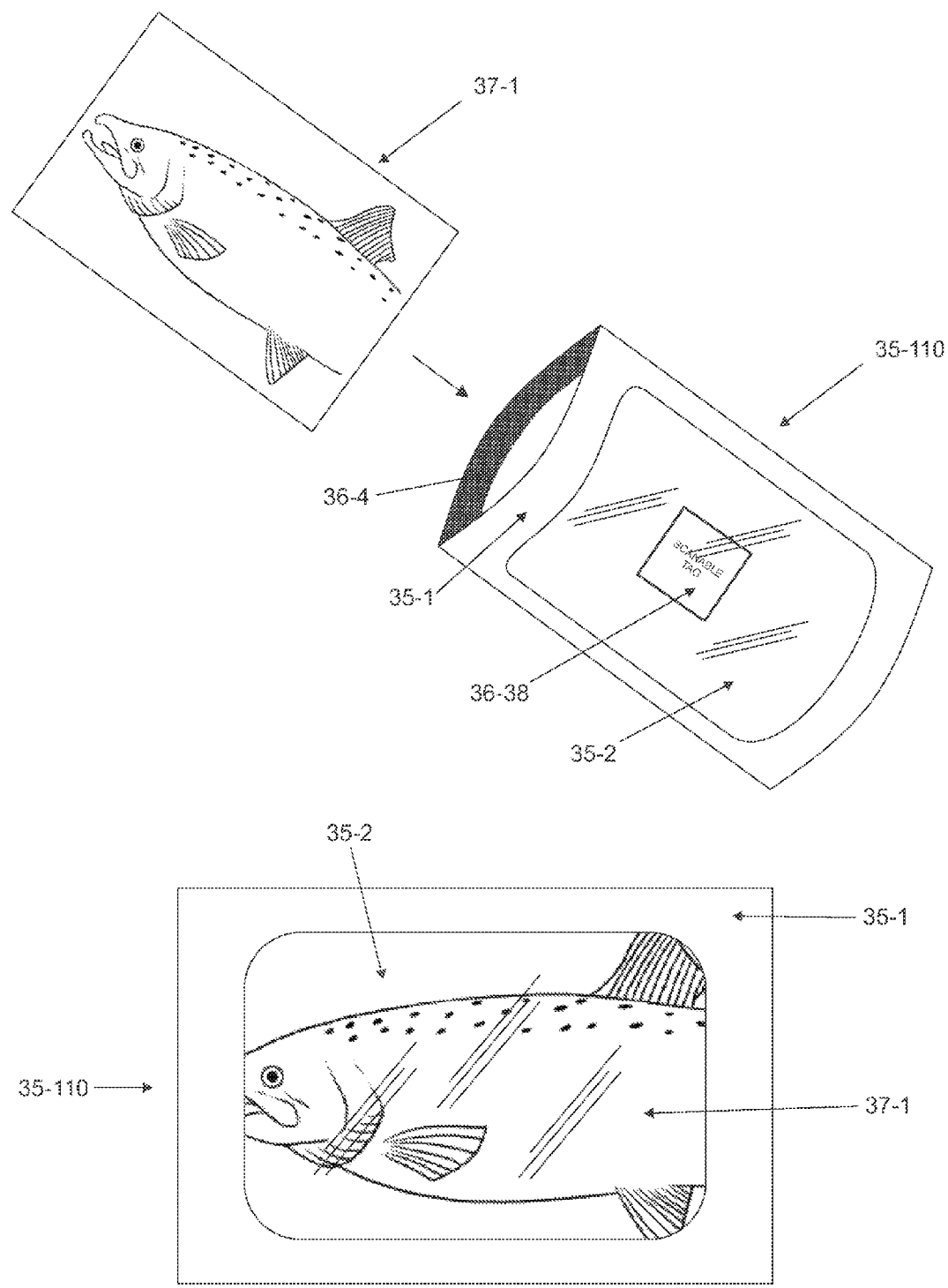
FIG. 37 is a combination front view and illustration showing the insertion of the insert into the reusable envelope for the postcard.

The scannable tag 36-38 may be placed in an area on the envelope that can be read through the see through area 35-2. The tag 36-38 is readable for example by the device of FIG. 7 and in the manner shown in FIGS. 7 and 8, however the insert 37-1 may be inserted between said first (front) and second (back) panel, 35-1 and 36-3, respectively. By inserting the insert, at least a portion of the scannable tag 36-38 is covered to provide at least some privacy for the sender and/or receiver of the media or multimedia file associated with the scannable tag. Further, in some examples, at least a portion of the graphic, painting, illustration, photo or image/message of a traditional postcard (insert 37-1) is viewable through the cut-out/see-through area (35-2), whilst covering the scannable tag 36-38). FIG. 37 is a combination front view and illustration showing the insertion of the insert into the reusable envelope for the postcard.

Figure 38:
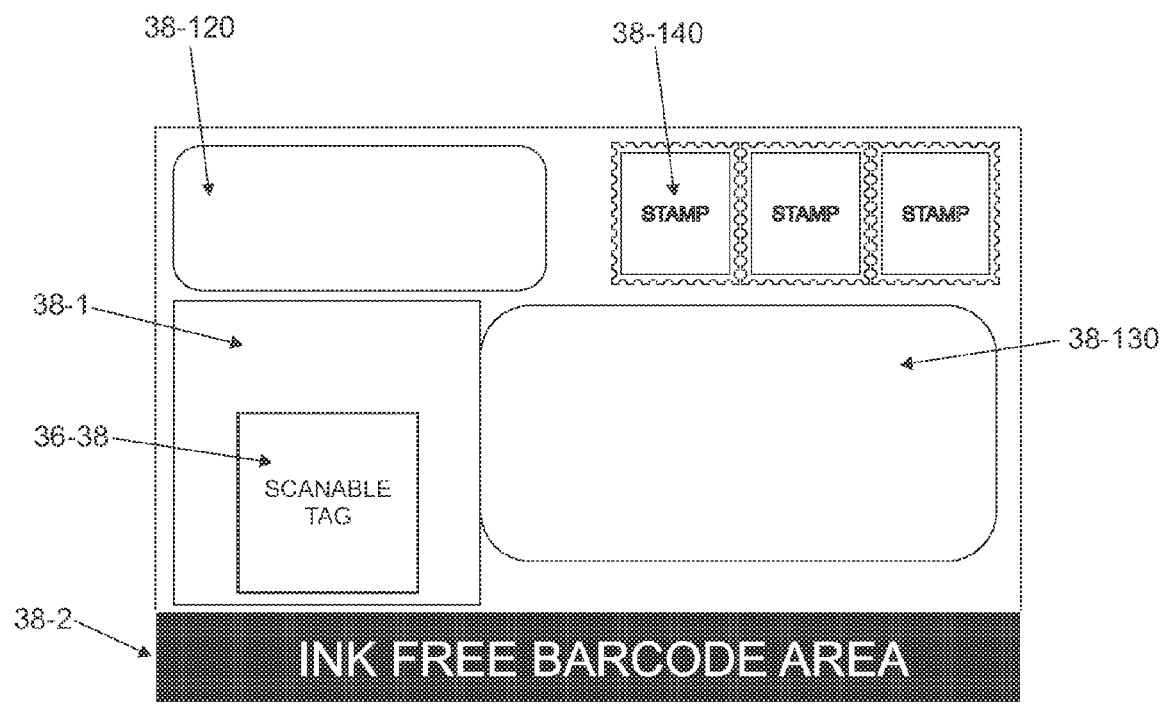
FIG. 38 is a back view of the post card envelope indicating the areas of interest showing a non-limiting embodiment for the placement of the scannable tag.

FIG. 38 is a back view of the post card envelope indicating the areas of interest showing a non-limiting embodiment for the placement of the scannable tag. There are areas for address labels (38-120 and 38-130), postage (38-140), an area for a note, message or illustration (38-1), an area for official postal use/cancellation bar area (38-2), and an area for a scannable tag area 36-38, that can be subsequently hidden by said labels, postage, notes, or other coverings, such that the scannable tag 36-38 is at least partially covered so that the scannable tag is not easily readable until the sender/recipient intends to view the corresponding media/multimedia file associated with said scannable tag. For added privacy, the scannable tag may also be password protected. In some embodiments, an ink free barcode area is provided which extends laterally along a bottom region of the envelope.

Figure 39:
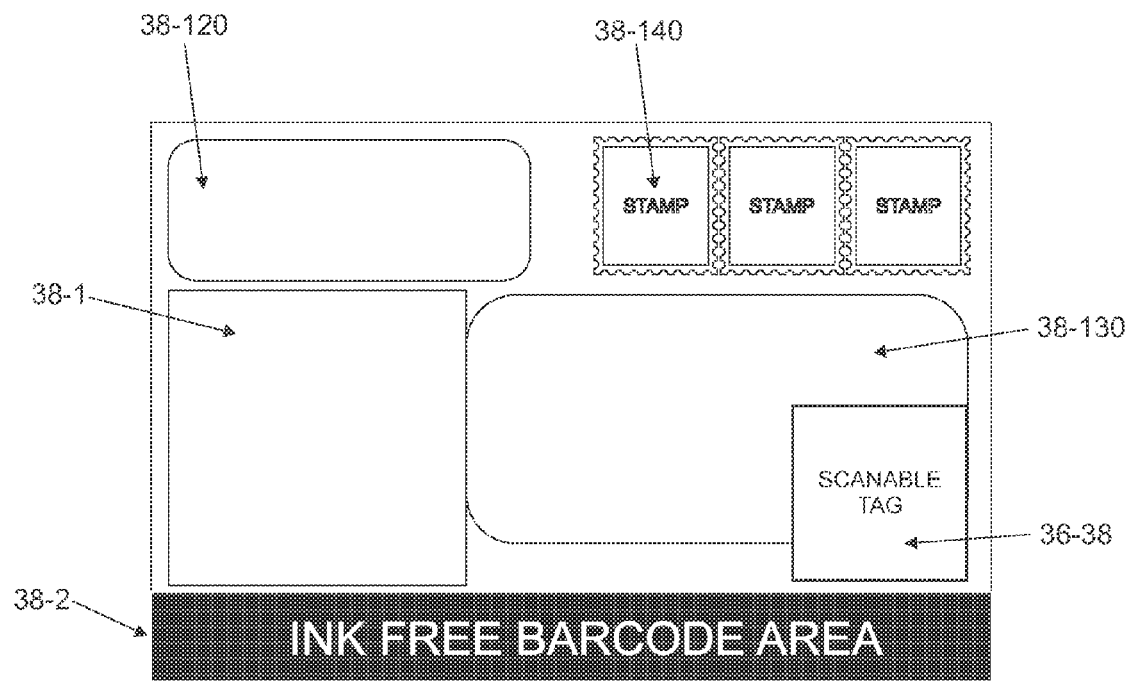
FIG. 39 is a back view of the post card envelope indicating the areas of interest showing a non-limiting embodiment for the placement of the scannable tag.

FIG. 39 is a back view of the post card envelope indicating the areas of interest as previously discussed in FIGS. 35 through 38, showing a non-limiting embodiment for the placement of the scannable tag area 36-38.

Figure 40:
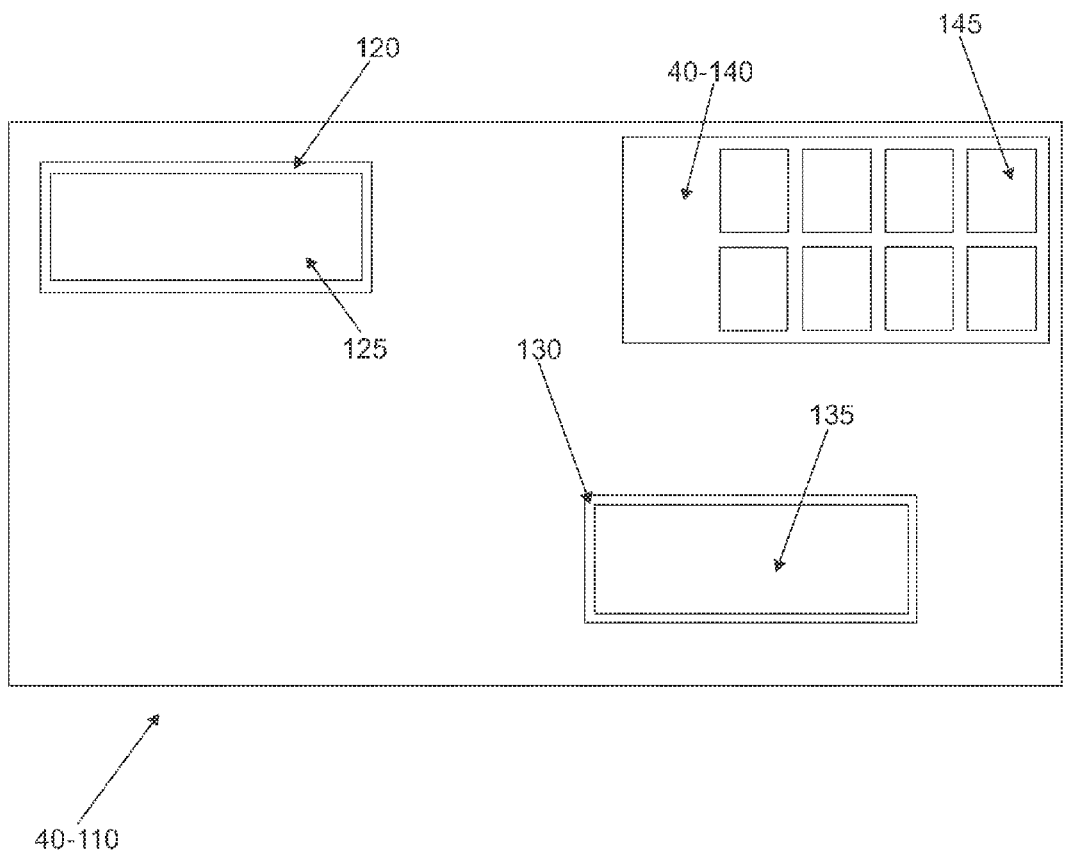
FIG. 40 is a front elevation view of a reusable envelope according to an embodiment of this invention.

FIG. 40 is a front elevation view of a reusable envelope according to an embodiment of this invention. The reusable envelope 40-110 has a specialized area (40-140) that allows postage (145) to be permanently affixed to the reusable envelope for a fixed number of reuses (40-140), 1, 2, 3, 4, etc. uses, for example. The reusable envelope has areas for other labels (120 and 130), where the addressee or return labels, 134 and 125, respectively be removably placed on said envelope 40-110. In some examples, the specialized area has markings thereon defining a plurality of postage receiving areas, such as boxes. In some embodiments, a surface region, which has the releaseble holding character as described herein which readily releases adhesive backed structures, is provided on the front of the envelope either selectively on areas 120 and 130, or substantially over the entire area of the front of the envelope. However, the specialized area is made from a material omitting the releasable holding character and is sized for permanently holding postage thereon to allow postage to be successively permanently affixed for the fixed number of reuses of the envelope. In some other embodiments, a surface region, which has the releaseble holding character, is provided on areas of the front of the envelope including specialized area 40-140 and is configured such that the postage receiving area becomes a permanent layer upon contact with the postage on the postage receiving area.

Figure 41:
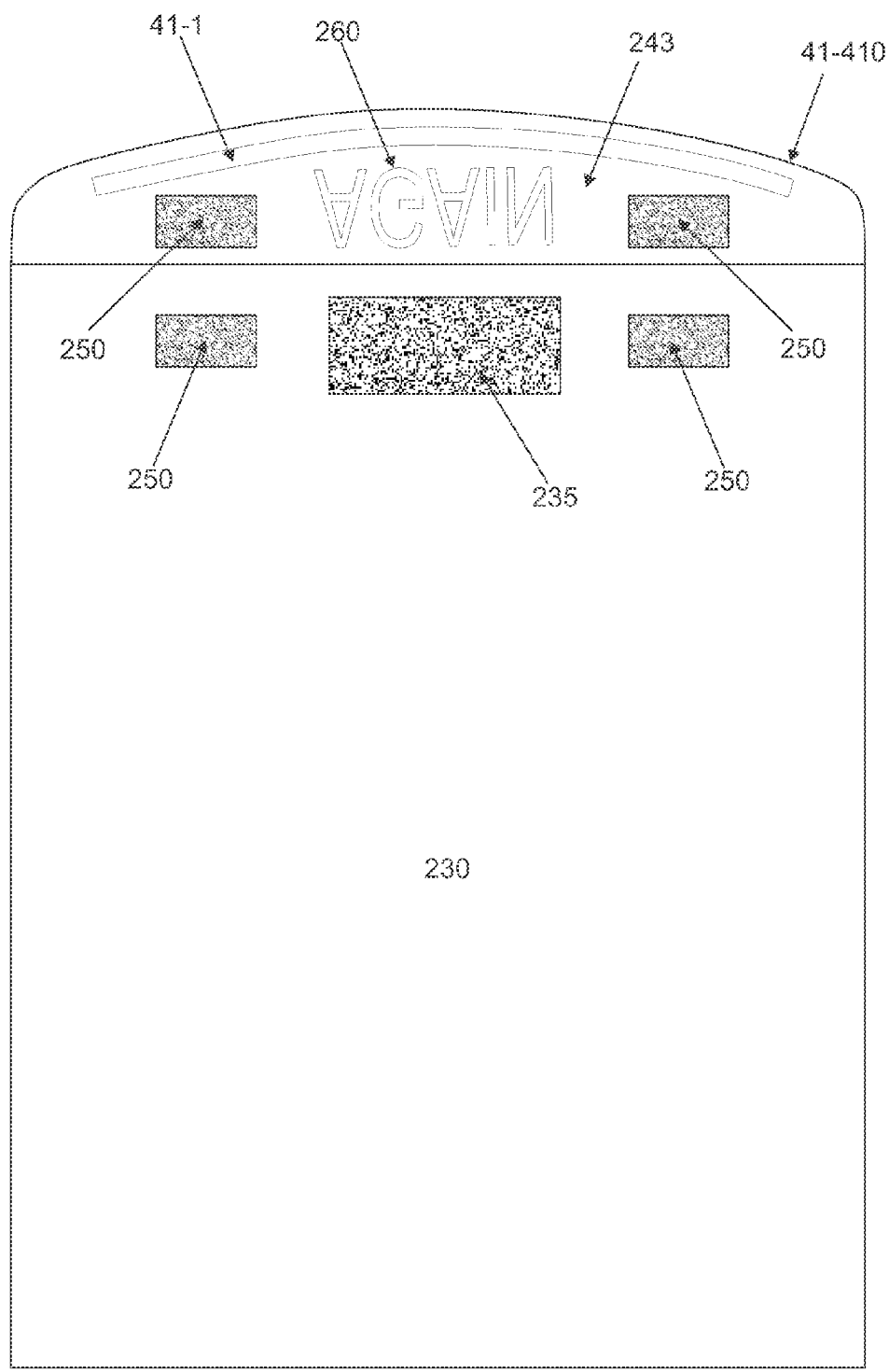
FIG. 41 is a perspective view similar to that which is shown in FIG. 10, but from a reverse angle, and showing the opening into a reusable envelope in an open configuration.

FIG. 41 is a front elevation of an envelope according to some embodiments and shows the opening into the reusable envelope in an open configuration. The envelope is equipped with a zone of permanent adhesive substantially covering the flap of the envelope 41-1. In this particular non-limiting embodiment, the permanent adhesive zone is an arc shape 41-1, but any other shape substantially covering at or about or near the perimeter of the envelope's closure flap (41-410) is envisaged that allows for a permanent closure and thereby provides the user with the option to permanently close the reusable envelope should the user so desire.

Figure 42:
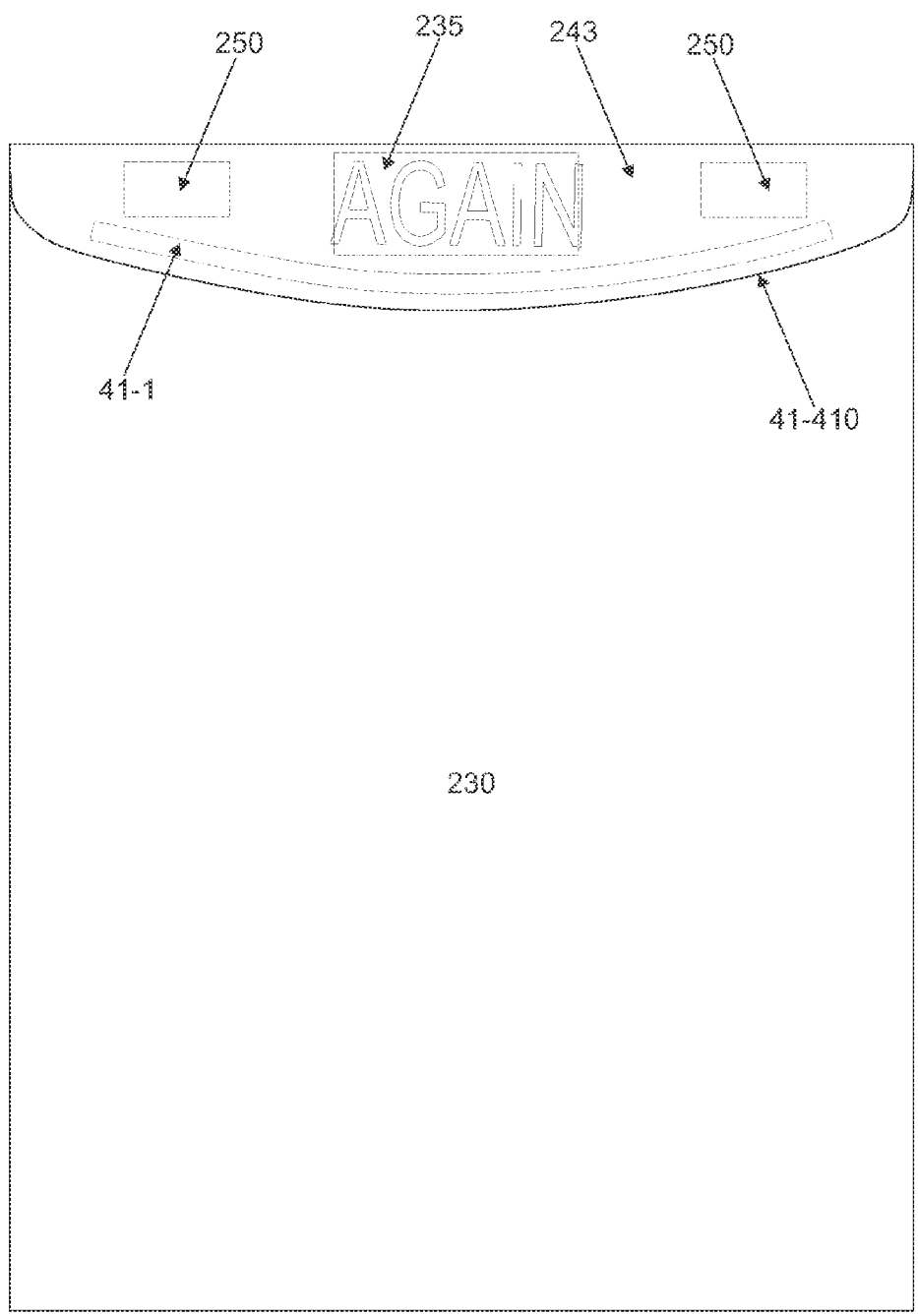
FIG. 42 is a rear elevation view of an alternative reusable envelope with a flap and configured for either resealable closure or permanent closure.

FIG. 42 is a rear elevation view of an alternative reusable envelope. The envelope has a flap and is configured for either resealable closure or permanent closure whereby the closure is closable with the reusable adhesive (235) or permanent adhesive (250 or 41-1). FIG. 42 shows the opening into the reusable envelope in an closed configuration. The envelope is equipped with a zone of permanent adhesive substantially covering the flap of the envelope 41-1. In this particular non-limiting embodiment an arc shape is shown 41-1, but any other shape substantially covering at or about or near the perimeter of the envelope's closure flap (41-410) are envisaged that allow for a permanent closure and thereby provides the user with the option to permanently close the reusable envelope should the user so desire.

Figure 43:
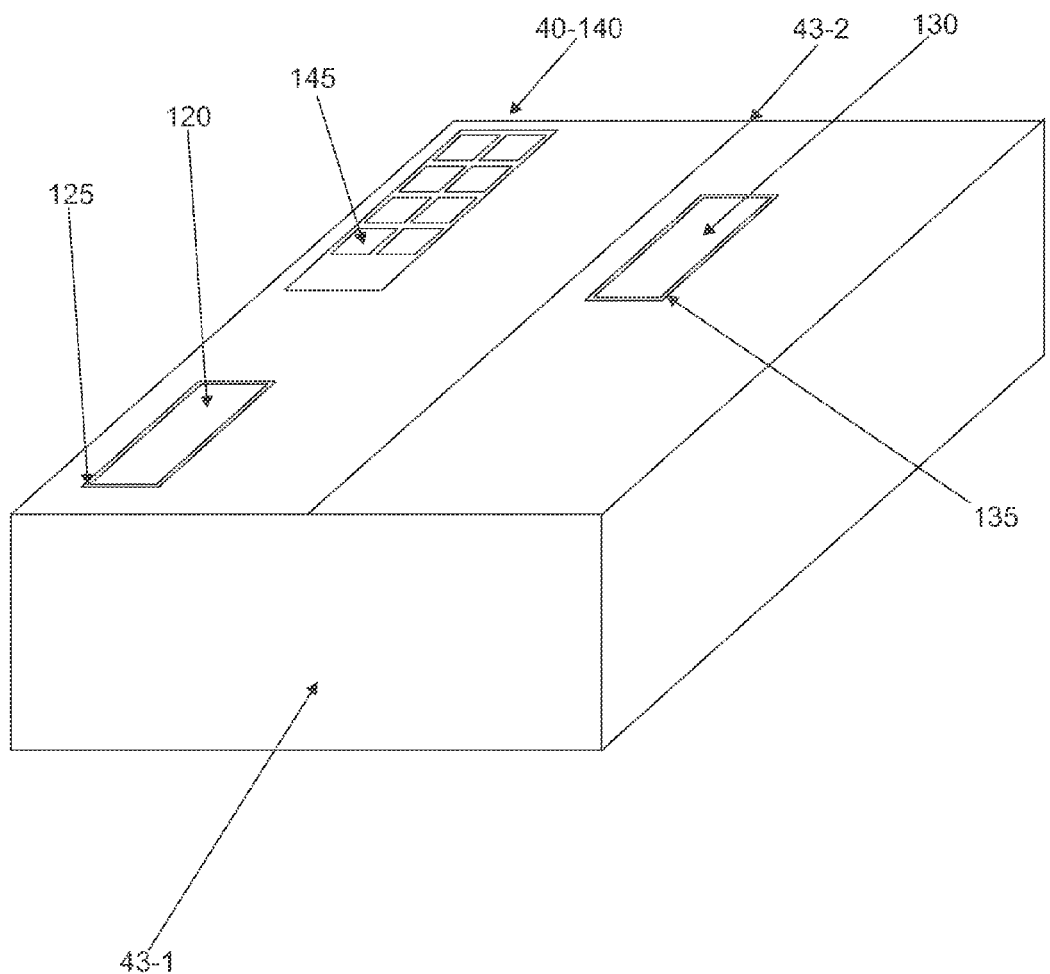
FIG. 43 is a is a perspective view of a reusable envelope or package.

FIG. 43 is a perspective view of a reusable envelope or package (43-1) with areas for removably applied labels (125 and 135) according to some embodiments. The package (43-1) also includes a specialized area that allows postage (145) to be permanently affixed to the reusable envelope for a fixed number of reuses (40-140). The reusable envelope has areas for other labels (120 and 130), where the addressee or return labels, 134 and 125, respectively be removably placed on said envelope 40-110. In some examples, the specialized area has markings thereon defining a plurality of postage receiving areas, such as boxes. In some embodiments, a surface region, which has the releaseble holding character as described herein which readily releases adhesive backed structures, is provided on the front of the envelope either selectively on areas 120 and 130, or substantially over the entire area of the front of the envelope. However, the specialized area is made from a material omitting the releasable holding character and is sized for permanently holding postage thereon to allow postage to be successively permanently affixed for the fixed number of reuses of the envelope. In some other embodiments, a surface region, which has the releaseble holding character, is provided on areas of the front of the envelope including specialized area 40-140 and is configured such that the postage receiving area becomes a permanent layer upon contact with the postage on the postage receiving area.

Figure 44:
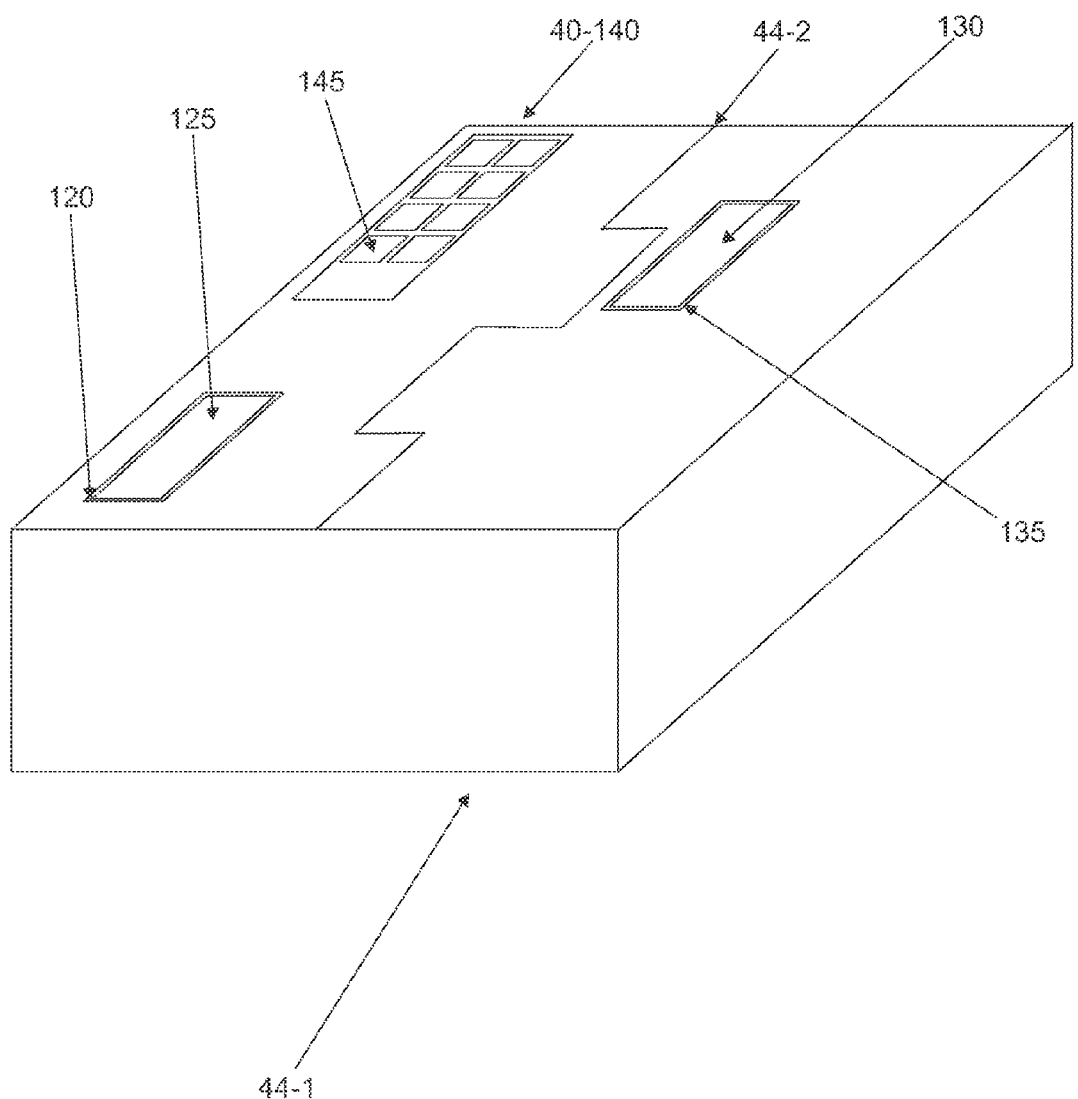
FIG. 44 is another perspective view of another embodiment of the present invention for reusable envelope or package with an interlocking closure.

FIG. 44 is another perspective view of another embodiment of the present invention for reusable envelope or package with an interlocking closure flaps 44-2. This embodiment has a specialized area 40-140 that allows postage (145) to be permanently affixed to the reusable envelope for a fixed number of reuses (40-140), 1, 2, 3, 4, etc. uses, for example. The reusable envelope has areas for other labels (120 and 130), where the addressee or return labels, 134 and 125, respectively be removably placed on said envelope 40-110. In some examples, the specialized area has markings thereon defining a plurality of postage receiving areas, such as boxes. In some embodiments, a surface region, which has the releaseble holding character as described herein which readily releases adhesive backed structures, is provided on the front of the envelope either selectively on areas 120 and 130, or substantially over the entire area of the front of the envelope. However, the specialized area is made from a material omitting the releasable holding character and is sized for permanently holding postage thereon to allow postage to be successively permanently affixed for the fixed number of reuses of the envelope. In some other embodiments, a surface region, which has the releaseble holding character, is provided on areas of the front of the envelope including specialized area 40-140 and is configured such that the postage receiving area becomes a permanent layer upon contact with the postage on the postage receiving area.

Figure 45:
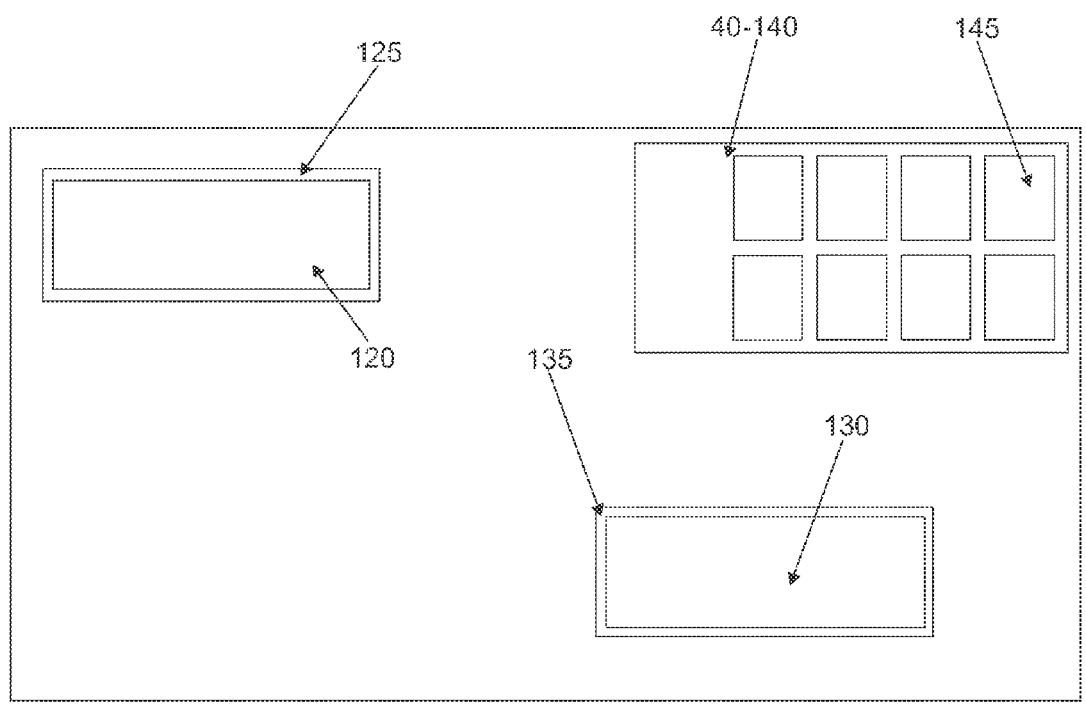
FIG. 45 is a front view of a reusable label of another embodiment of the present invention.

FIG. 45 is a front view of a reusable label of another embodiment of the present invention where this embodiment includes a specialized area that allows postage (145) to be permanently affixed to the reusable envelope for a fixed number of reuses (40-140), 1, 2, 3, 4, etc. uses, for example. The reusable envelope has areas for other labels (120 and 130), where the addressee or return labels, 134 and 125, respectively be removably placed on said envelope 40-110. In some examples, the specialized area has markings thereon defining a plurality of postage receiving areas, such as boxes. In some embodiments, a surface region, which has the releaseble holding character as described herein which readily releases adhesive backed structures, is provided on the front of the envelope either selectively on areas 120 and 130, or substantially over the entire area of the front of the envelope. However, the specialized area is made from a material omitting the releasable holding character and is sized for permanently holding postage thereon to allow postage to be successively permanently affixed for the fixed number of reuses of the envelope. In some other embodiments, a surface region, which has the releaseble holding character, is provided on areas of the front of the envelope including specialized area 40-140 and is configured such that the postage receiving area becomes a permanent layer upon contact with the postage on the postage receiving area.

The aforementioned embodiments provide truly reusable envelopes which can be easily reused multiple times either with a reusable card such as a greeting card or postcard or other reusable contents, or with single use contents.

This disclosure is provided to reveal a preferred embodiment of the invention and a best mode for practicing the invention. Having thus described the invention in this way, it should be apparent that various different modifications can be made to the preferred embodiment without departing from the scope and spirit of this invention disclosure. For instance, the alternative and exemplary embodiments of FIGS. 28-39 further depict variations of this invention. When structures are identified as a means to perform a function, the identification is intended to include all structures which can perform the function specified. When structures of this invention are identified as being coupled together, such language should be interpreted broadly to include the structures being coupled directly together or coupled together through intervening structures. Such coupling could be permanent or temporary and either in a rigid fashion or in a fashion which allows pivoting, sliding or other relative motion while still providing some form of attachment, unless specifically restricted.

What is claimed is:

1. A reusable envelope,
comprising in combination:
a front planar panel and a rear planar panel;
said panels adjacent each other with an open space therebetween; said open space sized to removably receive contents therein;
said front panel of said envelope including:
at least one first surface region having a releaseble holding character which readily releases adhesive backed structures, and
a second surface region made from a material omitting said releasable holding character and configured for permanently holding adhesive backed structures thereon to allow said adhesive backed structures to be successively permanently affixed for the fixed number of reuses of the envelope;
said envelope having an opening into said open space, said opening including a resealable closure;
wherein said envelope includes a flap adjacent said opening which pivots between an open orientation leaving said opening accessible and a closed orientation where said flap covers said opening and leaves said opening inaccessible; and
wherein said resealable closure comprises said flap adjacent said opening, said flap adapted to overlie said opening when in a closed orientation and reveal said opening for access through said opening when said flap is in an open orientation, said flap having a rear surface which has multiple separate stub regions coupled together through zones of weakness therebetween along which said stubs can be removed from each other, each said stub including a permanent adhesive thereon.

2. The envelope of claim 1 wherein said front panel of said envelope includes at least two of said first surface regions separated from one another and which are formed of a material which releasably holds separate adhesively backed structures thereon, the adhesively backed structures taken from the group of structures including postage, address labels and return labels, said at least three separate surface regions located on said front panel in standard mail processing locations specified for postage placement, address placement and return address placement.

3. The envelope of claim 2 wherein said second surface region is formed of a material which permanently holds adhesively backed structures thereon, the adhesively backed structures taken from the group of structures including postage, address labels and return labels, said at least three separate surface regions located on said front panel in standard mail processing locations specified for postage placement, address placement and return address placement.

4. The envelope of claim 3 wherein said second surface region is configured for permanently holding postage thereon to allow postage to be successively permanently affixed for a finite number of reuses of the envelope.

5. The envelope of claim 1, wherein said envelope has an area on the surface of the said envelope, wherein a scannable tag may be placed.

6. The envelope of claim 5, further comprising an area where the scannable tag is covered by at least a portion of at least one said adhesively backed structure to at least provide some privacy for said scannable tag.

7. The envelope of claim 6, wherein the user may remove the said adhesive backed structure to expose enough of the scannable tag such that the scannable tag is readable and links the user to the multimedia message previously recorded or uploaded.

8. A reusable package,
comprising in combination:
multiple panels;
said panels adjacent each other with an open space therebetween; said open space sized to removably receive contents therein;
said panels to fold together to be closed;
a panel of said package including:
at least one first surface region having a releasable holding character which readily releases adhesive backed structures, and
a second surface region made from a material omitting said releasable holding character and configured for permanently holding adhesive backed structures thereon to allow said adhesive backed structures to be successively permanently affixed for the fixed number of reuses of the package;
said package having an opening into said open space, said opening including a resealable closure;
wherein said package includes a flap adjacent said opening which pivots between an open orientation leaving said opening accessible and a closed orientation where said flap covers said opening and leaves said opening inaccessible; and wherein said resealable closure comprises said flap adjacent said opening, said flap adapted to overlie said opening when in a closed orientation and reveal said opening for access through said opening when said flap is in an open orientation, said flap having a rear surface which has multiple separate stub regions coupled together through zones of weakness therebetween along which said stubs can be removed from each other, each said stub including a permanent adhesive thereon.

9. The package of claim 8 wherein said front panel of said package includes at least two of said first surface regions separated from one another and which are formed of a material which releasably holds separate adhesively backed structures thereon, the adhesively backed structures taken from the group of structures including postage, address labels and return labels, said at least three separate surface regions located on said front panel in standard mail processing locations specified for postage placement, address placement and return address placement.

10. The package of claim 9 wherein said second region includes a surface region which is formed of a material which permanently holds adhesively backed structures thereon, the adhesively backed structures taken from the group of structures including postage, address labels and return labels, said at least three separate surface regions located on said front panel in standard mail processing locations specified for postage placement, address placement and return address placement.

11. The package of claim 10 wherein said second surface region is configured for permanently holding postage thereon to allow postage to be successively permanently affixed for a finite number of reuses of the envelope.

12. The package of claim 9, wherein said package has an area on the surface of the said package, wherein a scannable tag may be placed.

13. The package of claim 12, further comprising an area where the scannable tag is covered by at least a portion of at least one said adhesively backed structure to at least provide some privacy for said scannable tag.

14. The package of claim 13, wherein the user may remove the said adhesive backed structure to expose enough of the scannable tag such that the scannable tag is readable and links the user to the multimedia message previously recorded or uploaded.

15. A reusable shipping label, comprising in combination:
a panel;
said panel of said shipping label including:
   at least one first surface region having a releaseble holding character which readily releases adhesive backed structures, and
   a second surface region made from a material omitting said releasable holding character and configured for permanently holding adhesive backed structures thereon to allow said adhesive backed structures to be successively permanently affixed for the fixed number of reuses of the envelope; and
wherein said shipping label has an area on the surface of the said shipping label, wherein a scannable tag may be placed.

16. The shipping label of claim 15 wherein said front panel of said shipping label includes at least two of said first surface regions separated from one another which are formed of a material which releasably holds separate adhesively backed structures thereon, the adhesively backed structures taken from the group of structures including postage, address labels and return labels, said at least three separate surface regions located on said front panel in standard mail processing locations specified for postage placement, address placement and return address placement.

17. The shipping label of claim 16 wherein said second surface region is formed of a material which permanently holds adhesively backed structures thereon, the adhesively backed structures taken from the group of structures including postage, address labels and return labels, said at least three separate surface regions located on said front panel in standard mail processing locations specified for postage placement, address placement and return address placement.

18. The shipping label of claim 17 wherein said second surface region is configured for permanently holding postage thereon to allow postage to be successively permanently affixed for a finite number of reuses of the envelope.

19. The shipping label of claim 15, further comprising an area where the scannable tag is covered by at least a portion of at least one said adhesively backed structure to at least provide some privacy for said scannable tag.

20. The shipping label of claim 19, wherein the user may remove the said adhesive backed structure to expose enough of the scannable tag such that the scannable tag is readable and links the user to the multimedia message previously recorded or uploaded.

\* \* \* \* \*